(12) United States Patent
Yamada et al.

(10) Patent No.: US 7,441,255 B2
(45) Date of Patent: Oct. 21, 2008

(54) DISK RECORDING/REPRODUCING APPARATUS WITH CARTRIDGE DROP PREVENTING MECHANISM HAVING ELASTIC FLAP PORTION

(75) Inventors: Takahiro Yamada, Saitama (JP); Kazuhito Kurita, Kanagawa (JP); Mikinori Matsuda, Kanagawa (JP); Toru Morikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/563,589

(22) PCT Filed: May 10, 2005

(86) PCT No.: PCT/JP2005/008844

§ 371 (c)(1), (2), (4) Date: Jan. 6, 2006

(87) PCT Pub. No.: WO2005/109422

PCT Pub. Date: Nov. 17, 2005

(65) Prior Publication Data

US 2006/0168597 A1    Jul. 27, 2006

(30) Foreign Application Priority Data

May 10, 2004    (JP) .............................. 2004-139628

(51) Int. Cl.
*G11B 17/04*    (2006.01)
*G11B 17/03*    (2006.01)

(52) U.S. Cl. ................... 720/639; 720/640; 720/641

(58) Field of Classification Search .............. 360/99.02, 360/99.06; 720/630–644
See application file for complete search history.

(56) References Cited

U.S. PATENT DOCUMENTS

| 4,879,616 A | * | 11/1989 | Ando | 360/99.06 |
| 4,887,174 A | * | 12/1989 | Tezuka | 360/99.06 |
| 4,901,172 A | * | 2/1990 | Nakazawa et al. | 360/99.06 |

(Continued)

FOREIGN PATENT DOCUMENTS

DE    3820801 A1    2/1989

(Continued)

OTHER PUBLICATIONS

U.S. Appl. No. 10/563,589, filed Jan. 6, 2006, Yamada et al.

*Primary Examiner*—Craig A Renner
(74) *Attorney, Agent, or Firm*—Oblon, Spivak, McClelland, Maier & Neustadt, P.C.

(57) ABSTRACT

A disk recording/reproducing apparatus includes a chassis rotatably supporting a holder for storing a disk cartridge; an eject lever movably disposed in the chassis in an insertion/removal direction of the disk cartridge and movably in a direction toward or away from the chassis. The eject lever is rotated by being pushed by the disk cartridge 1 inserted into the holder. A cartridge drop preventive mechanism prevents the disk cartridge ejected by the eject lever from dropping from the cartridge holder. The cartridge drop preventive mechanism is formed from a flat spring disposed on one side surface of the holder and makes a sliding contact with one side surface of the disk cartridge during unloading of the cartridge so as to give the disk cartridge a braking force. This arrangement can prevent the disk cartridge from jumping out and dropping off from the cartridge holder during ejection.

11 Claims, 24 Drawing Sheets

U.S. PATENT DOCUMENTS

| | | | | |
|---|---|---|---|---|
| 5,216,558 | A | * | 6/1993 | Griffith et al. ............ 360/99.06 |
| 5,610,890 | A | * | 3/1997 | Eum et al. ................ 360/99.06 |
| 5,646,926 | A | * | 7/1997 | Handa et al. ................ 720/636 |
| 6,172,845 | B1 | * | 1/2001 | Tatehata et al. .......... 360/99.02 |
| 6,802,069 | B1 | * | 10/2004 | Kojima ....................... 720/613 |
| 6,826,767 | B1 | * | 11/2004 | Kojima ....................... 720/630 |
| 2001/0048572 | A1 | * | 12/2001 | Kojima ................... 360/99.06 |
| 2002/0159374 | A1 | * | 10/2002 | Kurozuka et al. ........ 360/99.06 |
| 2004/0004865 | A1 | * | 1/2004 | Kanada et al. ............. 365/200 |
| 2004/0062175 | A1 | * | 4/2004 | Inoue ....................... 369/77.2 |
| 2005/0248879 | A1 | | 11/2005 | Matsuda et al. .......... 360/99.06 |
| 2005/0251816 | A1 | | 11/2005 | Matsuda et al. ............ 720/6.36 |
| 2005/0251817 | A1 | | 11/2005 | Yamada et al. .............. 720/640 |

FOREIGN PATENT DOCUMENTS

| | | |
|---|---|---|
| DE | 4436462 A1 | 4/1995 |
| JP | 59104755 A | 6/1984 |
| JP | 59112471 A | 6/1984 |
| JP | 63061454 A | 3/1988 |
| JP | 02110881 A | 4/1990 |
| JP | 03207048 A | 9/1991 |
| JP | 9-69255 | 3/1997 |
| JP | 2000-113550 | 4/2000 |
| JP | 2000173223 A | 6/2000 |
| JP | 2001189043 A | 7/2001 |
| JP | 2003-115153 | 4/2003 |
| JP | 2004-79046 | 3/2004 |

* cited by examiner

DISK RECORDING/REPRODUCING APPARATUS WITH CARTRIDGE DROP PREVENTING MECHANISM HAVING ELASTIC FLAP PORTION

TECHNICAL FIELD

The present invention relates to a disk recording and/or reproducing apparatus including cartridge drop preventive means for preventing a disk cartridge from being dropped by momentum from a cartridge holder during ejection.

BACKGROUND ART

There is known a disk apparatus having cartridge drop preventive means. The apparatus includes a pull plate that traverses a cartridge insertion path and is guided so as to be moved in parallel with a cartridge insertion direction. An inserted cartridge is abutted against the pull plate. The apparatus further includes a fitting holding member that fits elastically into recessed portions of the cartridge on both sides of the pull plate. The cartridge is held in position by this fitting holding member relative to the pull plate. During ejection, the pull plate is stopped at a predetermined position by a stopper. (See, for example, Japanese Patent Laid-open No. 2001-189043 (paragraphs 0056 through 0068, and the like).)

Another known art is a disk cartridge that uses a spring to urge a shutter in a closing direction. The disk cartridge includes holding recessed portions disposed on a bottom surface of a case main body thereof. The holding recessed portions are engaged with, and held by, capturing bodies included in a disk drive. A closure reaction of the shutter spring during ejection operation is used to prevent the case main body from jumping out of a loading port of the disk drive. (See, for example, Japanese Patent Laid-open No. 2000-173223 (paragraphs 0006 through 0009, 0013 through 0016, and the like).)

DISCLOSURE OF THE INVENTION

The cartridge drop preventive means disclosed in Japanese Patent Laid-open No. 2001-189043 (paragraphs 0056 through 0068, and the like) uses the pull plate, the fitting holding member, the stopper, a lever member, and the like. This has presented the following problems: specifically, an increased number of parts used; a complicated structure; and an increased cost.

The cartridge drop preventive means disclosed in Japanese Patent Laid-open No. 2000-173223 (paragraphs 0006 through 0009, 0013 through 0016, and the like) includes the holding recessed portions disposed on the bottom surface of the case main body of the disk cartridge and the holding recessed portions are engaged with, and held by, the capturing bodies included in the disk drive. This has led to a problem, in which the capturing bodies cause the disk cartridge to raise, or the like.

It is an object of the present invention to provide a disk recording and/or reproducing apparatus including cartridge drop preventive means that is capable of positively preventing, with a simple structure, the disk cartridge from being dropped and without raising the problem of a raised disk cartridge or the like.

The disk recording and/or reproducing apparatus, to which the present invention is applied, includes a cartridge holder, a chassis, recording and/or reproducing means, an eject lever, urge means, and cartridge drop preventive means. A disk cartridge is inserted in, and held by, the cartridge holder. The chassis supports the cartridge holder movably between a cartridge insertion/removal position and a recording/reproducing position. The recording and/or reproducing means is disposed in the chassis and records and/or reproduces the disk cartridge. The eject lever is disposed in the chassis movably in an insertion/removal direction of the disk cartridge and movably in a direction toward or away from the chassis. The eject lever is moved by being pushed by the disk cartridge inserted into the cartridge holder. The urge means gives the eject lever a moving force in a disk cartridge unloading direction and an urging force in a direction of approaching the chassis. The cartridge drop preventive means gives a braking force to the disk cartridge being unloaded by the urge means, thereby preventing the disk cartridge from dropping off from the cartridge holder.

In the present invention, the cartridge drop preventive means is formed from a spring member disposed on a first side surface plate of the cartridge holder. The spring member makes a sliding contact with a first side surface of the disk cartridge during unloading of the disk cartridge so as to give the disk cartridge a braking force.

In particular, the cartridge drop preventive means is formed to include an elastic flap portion and a protruded portion. The elastic flap portion extends toward a cartridge insertion port in the cartridge holder. The protruded portion is disposed on a leading end portion of the elastic flap portion and makes a sliding contact with the first side surface of the disk cartridge during unloading of the disk cartridge. Still another arrangement is made to keep the protruded portion disposed on the leading end of the elastic flap portion in a noncontact state relative to the first side surface of the disk cartridge when storage of the disk cartridge in the cartridge holder is completed.

The cartridge drop preventive means is disposed on a first side surface plate opposing a second side surface plate of the cartridge holder, on which a shutter lock release member is disposed.

Further, the cartridge drop preventive means is formed by cutting and raising the first side surface of the cartridge holder.

BEST MODE FOR CARRYING OUT THE INVENTION

A disk recording and/or reproducing apparatus to which the present invention is applied will be described below in the following order: (1) General construction of the apparatus and construction of the cartridge drop preventive means; (2) Construction of the disk cartridge; (3) Construction of the cartridge holder; (4) Construction of the chassis; (5) Construction of the recording and/or reproducing means; (6) Construction of the eject lever; (7) Construction of the urge means and the eject lever lock means; (8) Construction of the lock release means; (9) Other arrangements; and (10) Operation.

Figure 1:
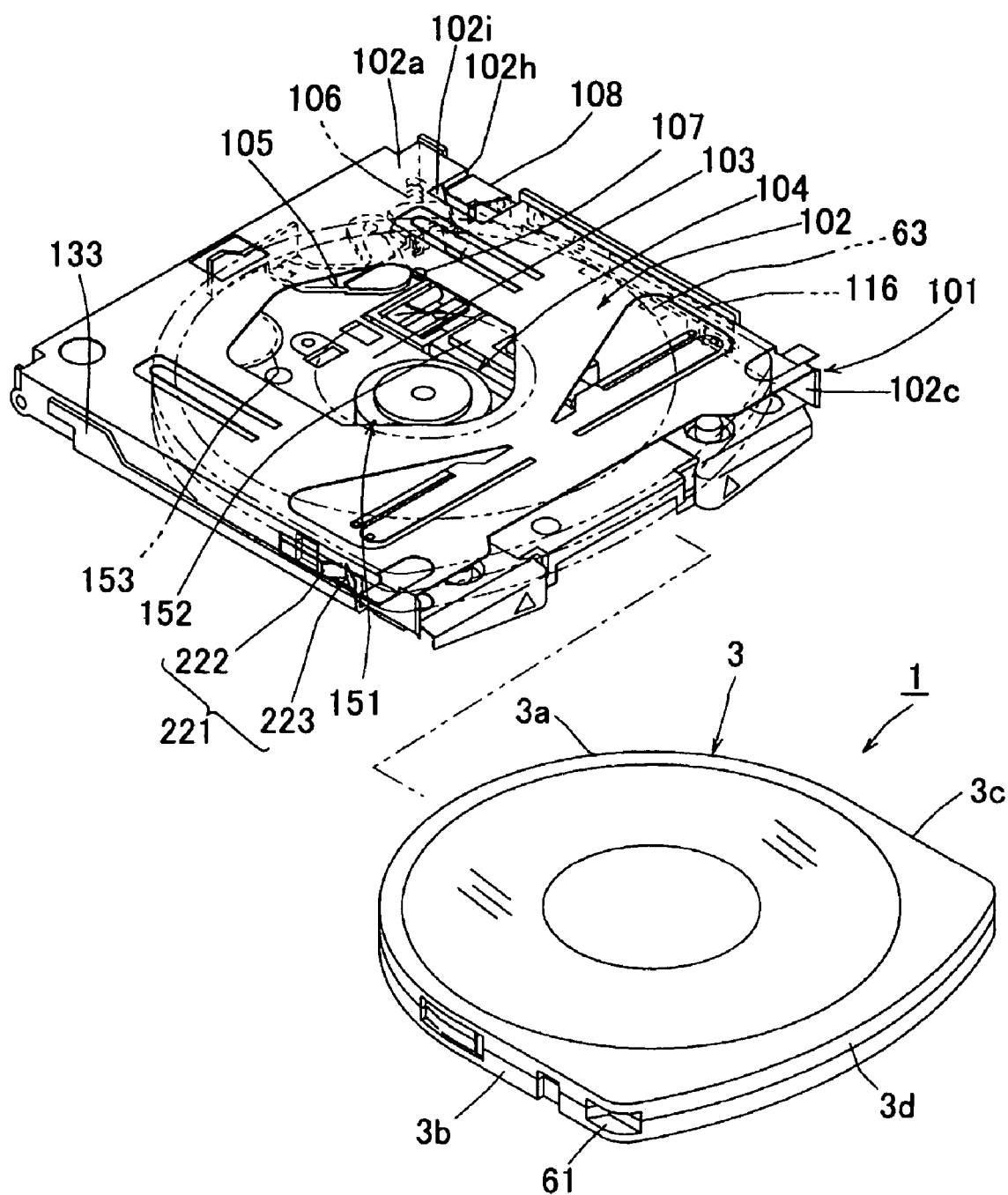
FIG. 1 is a perspective view showing a disk recording and/or reproducing apparatus.
Figure 2:
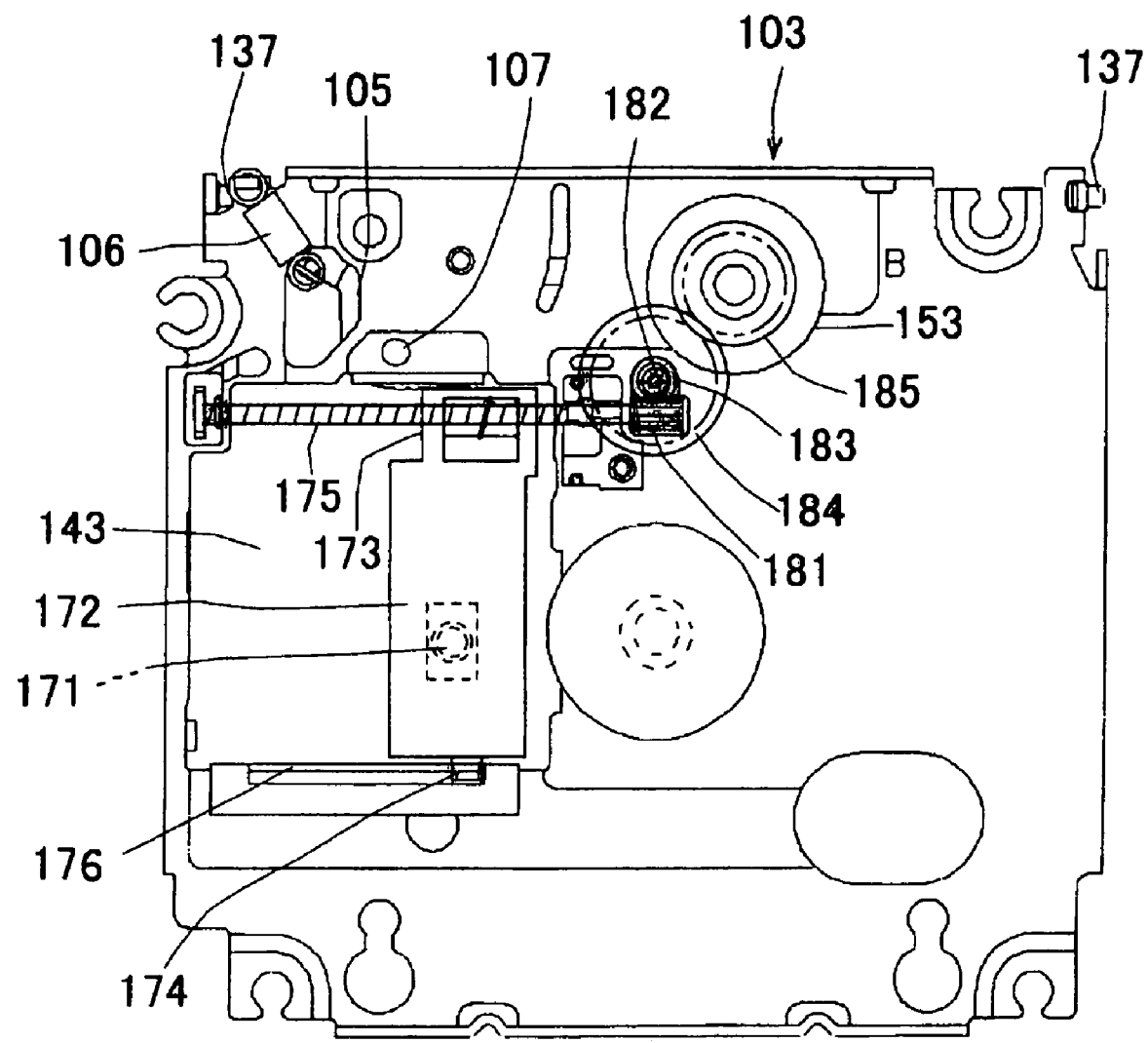
FIG. 2 is a plan view showing the disk recording and/or reproducing apparatus as viewed from a backside.
Figure 3:
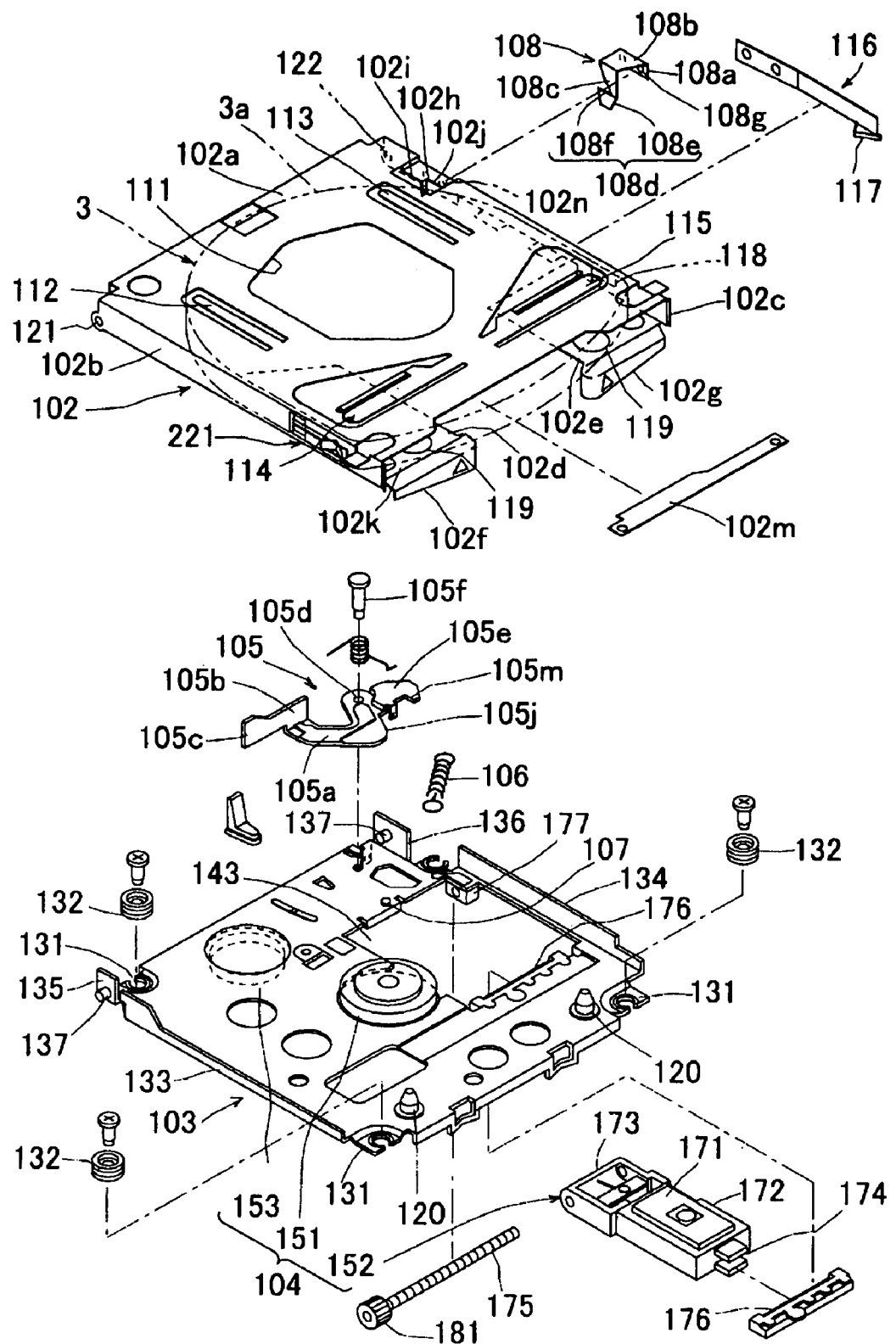
FIG. 3 is an exploded perspective view showing the disk recording and/or reproducing apparatus.

(1) General Construction of the Apparatus and Construction of the Cartridge Drop Preventive Means FIG. 1 is a perspective view showing the disk recording and/or reproducing apparatus, to which the present invention is applied. FIG. 2 is a plan view as viewed from a backside. FIG. 3 is an exploded perspective view. A disk recording and/or reproducing apparatus 101 includes a cartridge holder 102, a chassis 103, recording and/or reproducing means 104, an eject lever 105, urge means 106, eject lever lock means 107, lock release means 108, and cartridge drop preventive means 221. A disk cartridge 1 is inserted in, and held by, the cartridge holder 102. The chassis 103 supports the cartridge holder 102 movably between a cartridge insertion/removal position and a recording/reproducing position. The recording and/or reproducing means 104 is disposed in the chassis 103 and records and/or reproduces the disk cartridge 1. The eject lever 105 is disposed in the chassis 103 rotationally movably (hereinafter referred to simply as "rotatably") in an insertion/removal direction of the disk cartridge 1 and movably in a direction toward or away from the chassis 103. The eject lever 105 is rotated by being pushed by the disk cartridge 1 inserted into the cartridge holder 102. The urge means 106 gives the eject lever 105 a rotational force in a disk cartridge unloading direction and an urging force in a direction of approaching the chassis 103. The eject lever lock means 107 locks the eject lever 105, which has been rotated by the insertion of the disk cartridge 1, onto the chassis 103. The lock release means 108 releases a lock of the eject lever 105 by the eject lever lock means 107 when the cartridge holder 102 is rotated from the recording/reproducing position to the cartridge insertion/removal position.

The cartridge drop preventive means 221 is formed from a flat spring member disposed on a first side surface plate 102b of the cartridge holder 102. The flat spring member makes a sliding contact with a first side surface 3b of the disk cartridge 102 during unloading of the disk cartridge so as to give the disk cartridge 1 a braking force.

The cartridge drop preventive means 221 includes an elastic flap portion 222 and a protruded portion 223. The elastic flap portion 222 extends toward a cartridge insertion port 102k in the cartridge holder 102. The protruded portion 223 is disposed on a leading end portion of the elastic flap portion 222 and contacts the first side surface 3b of the disk cartridge 1 during unloading of the disk cartridge.

Figure 29A:
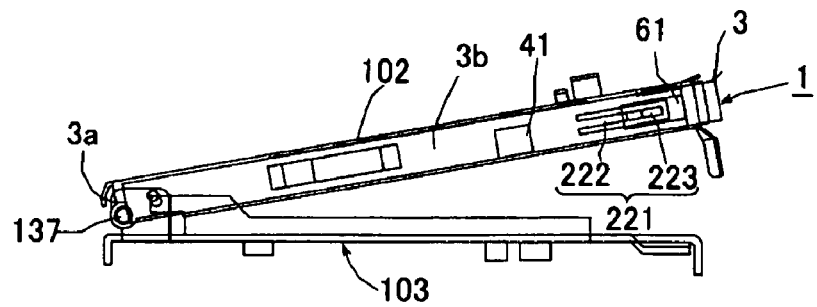
FIG. 29A is a side elevational view showing an operation when a disk cartridge including a shutter is used.
Figure 29B:
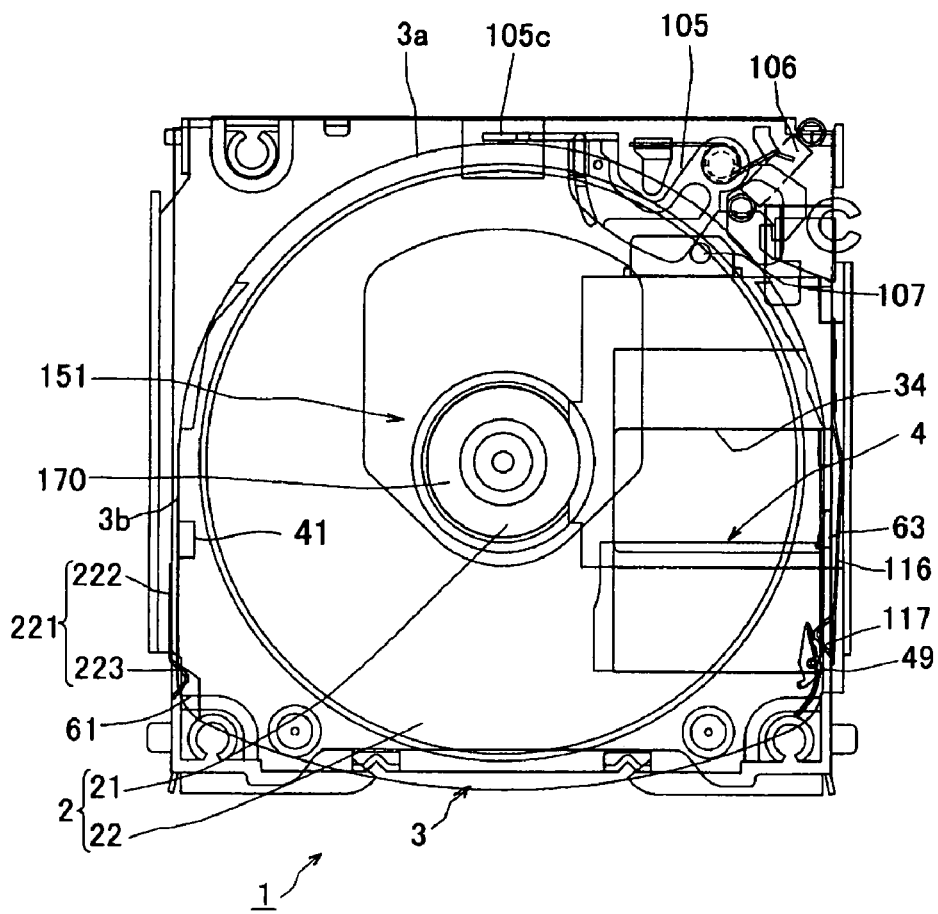
FIG. 29B is a plan view showing the same.

Referring to FIGS. 29A and 29B, the protruded portion 223 fits into a recessed portion 61 disposed in the first side surface 3b of the disk cartridge 1 for releasing a first side pressure and is kept in a noncontact condition with respect to the first side surface 3b when storage of the disk cartridge 1 in the cartridge holder 102 is completed.

A second side surface plate 102c opposing the first side surface plate 102b of the cartridge holder 102 including the cartridge drop preventive means 221 includes a shutter lock release member 116.

The cartridge drop preventive means 221 is formed by cutting and raising the first side surface plate 102b of the cartridge holder 102, or by providing a window portion in the first side surface plate 102b of the cartridge holder 102 and the attaching the cartridge drop preventive means 221 made of a flat spring so as to face the window portion.

(2) Construction of the Disk Cartridge

Figure 9:
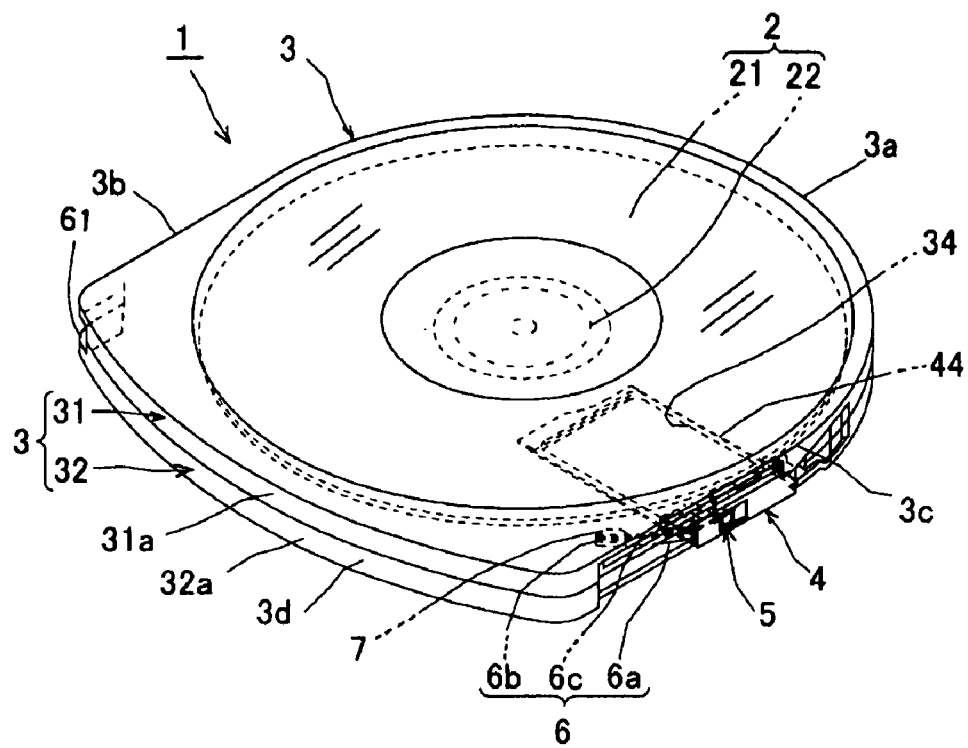
FIG. 9 is a perspective view showing a disk cartridge (wherein a shutter is closed).
Figure 10:
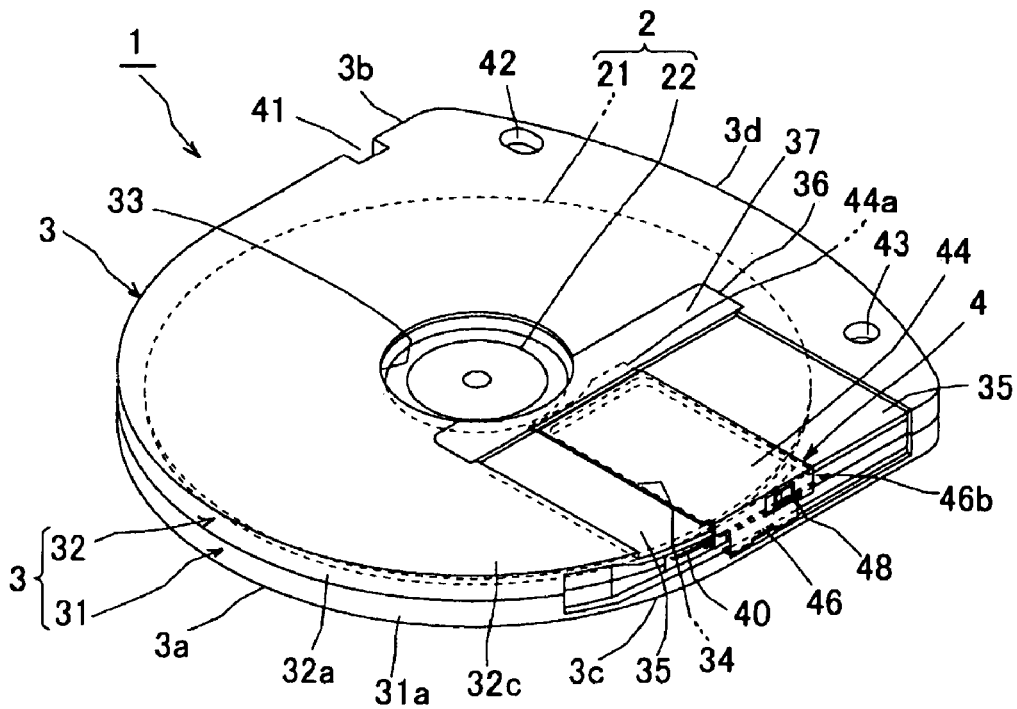
FIG. 10 is a perspective view showing the disk cartridge as viewed from a backside thereof (wherein the shutter is closed).
Figure 11:
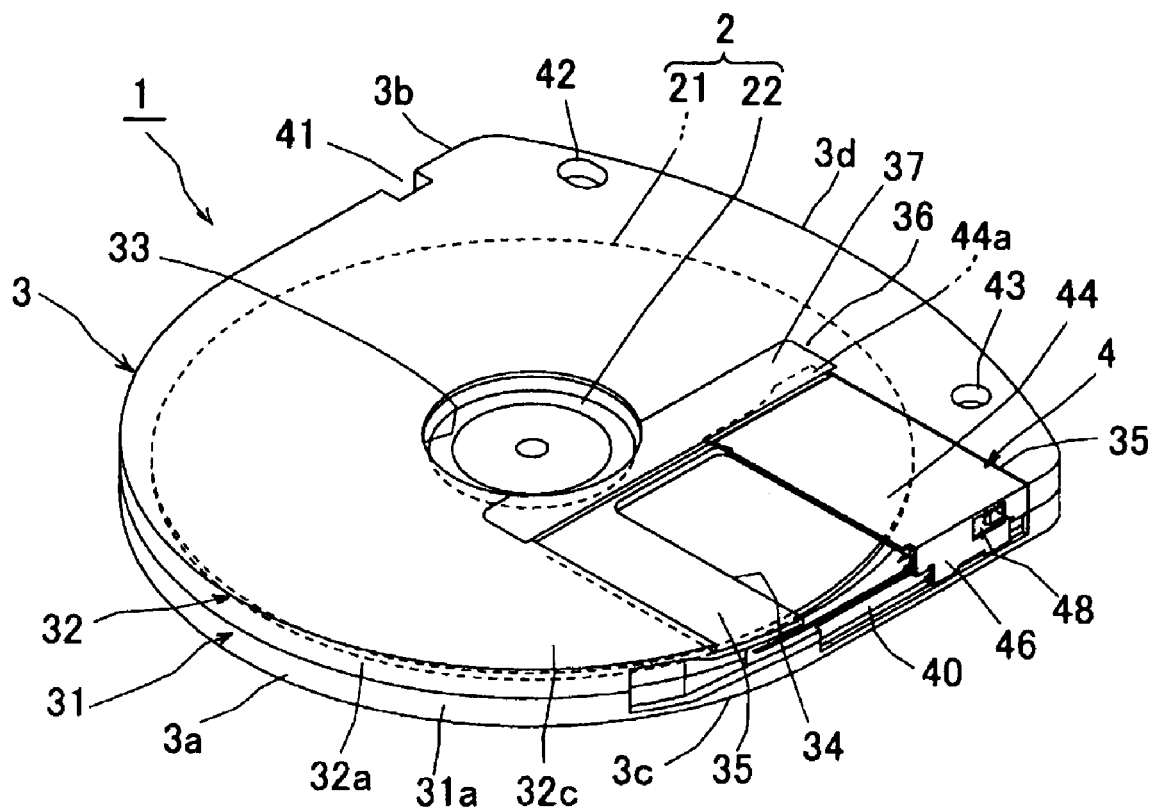
FIG. 11 is a perspective view showing the disk cartridge as viewed from the backside thereof (wherein the shutter is open).

FIG. 9 is a perspective view showing the disk cartridge 1 as viewed from an upper half side. FIG. 10 is a perspective view showing the disk cartridge 1 as viewed from a lower half side. FIG. 11 is a perspective view showing a condition, in which a shutter member is slid to expose an opening portion for recording and/or reproducing.

The disk cartridge 1 includes a disk-shaped recording medium 2, a cartridge main body 3, a shutter member 4, a shutter movement restriction member 5, an urge member 6, and a deformation preventive portion 7. The cartridge main body 3 accommodates the disk-shaped recording medium 2 rotatably within a circular disk storage portion and includes a recording and/or reproducing opening portion 34 that allows part of the disk-shaped recording medium 2 to face an outside. The shutter member 4 is mounted in the cartridge main body 3 movably between a position of closing the recording and/or reproducing opening portion 34 and a position of opening the recording and/or reproducing opening portion 34. The shutter movement restriction member 5 (see FIG. 14) restricts the shutter member 4 from moving in a direction of opening the recording and/or reproducing opening portion 34 by being engaged with a movement restriction portion 3e disposed in the cartridge main body 3 when the shutter member 4 is located at the position of closing the recording and/or reproducing opening portion 34. The urge member 6 urges the shutter movement restriction member 5 in a direction of being engaged with the movement restriction portion 3e disposed in the cartridge main body 3. The deformation preventive portion 7 prevents the urge member 6 from being deformed by an external force.

The urge member 6 includes an extension flap 6a and an elastic displacement flap 6c. The extension flap 6a is extended from one side of the shutter member 4. The elastic displacement flap 6c is formed by folding back the extension flap 6a via a fold back portion 6b disposed at a leading end portion of the extension flap 6a so as to overlap an inside of the extension flap 6a.

The deformation preventive portion 7 is disposed on a back of the leading end portion of the urge member 6. The deformation preventive portion 7 supports the urge member 6 from the back, thereby preventing the urge member 6 from being deformed by an external force.

Figure 12:
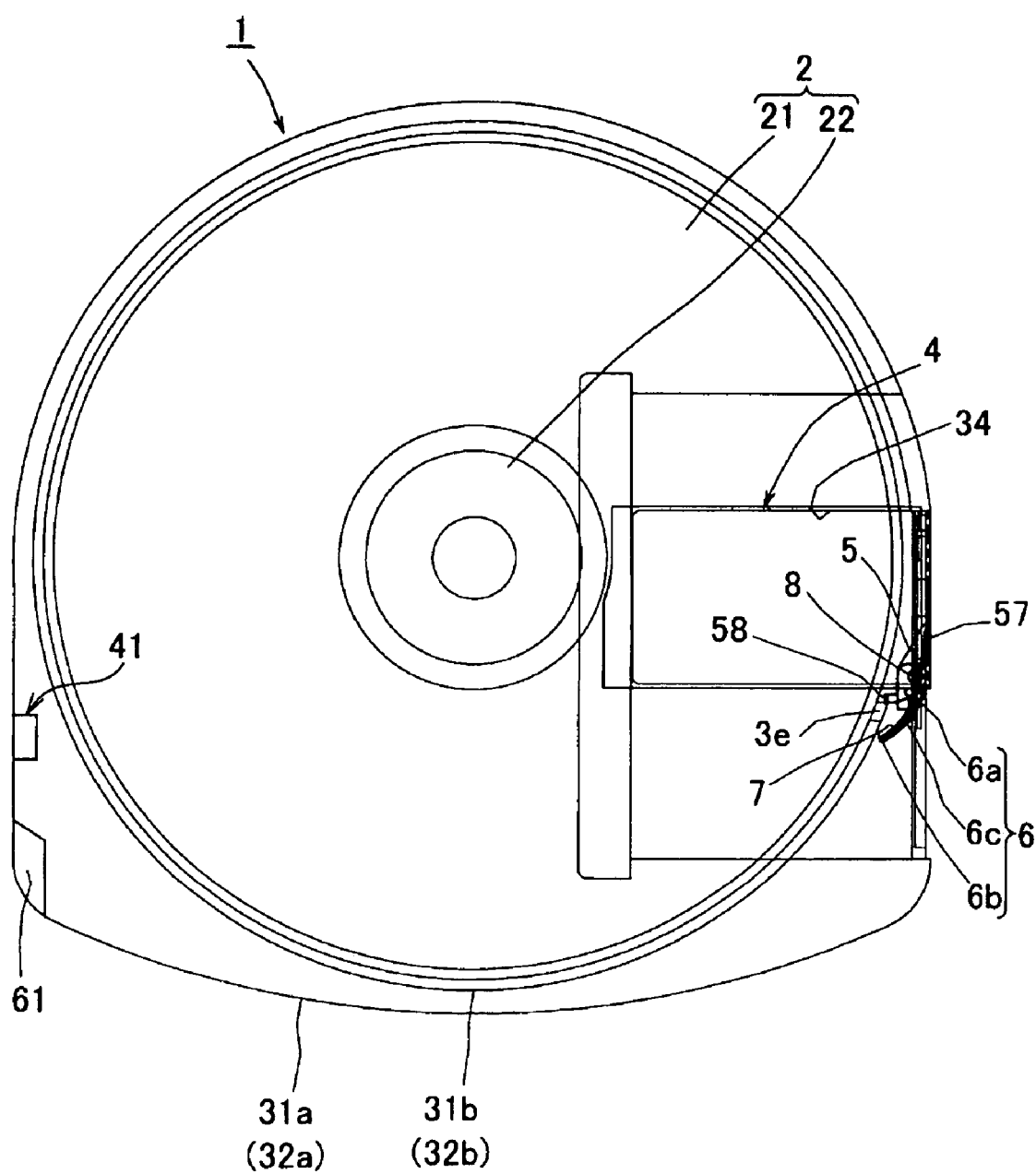
FIG. 12 is a plan view showing a condition, in which the shutter is locked.
Figure 13:
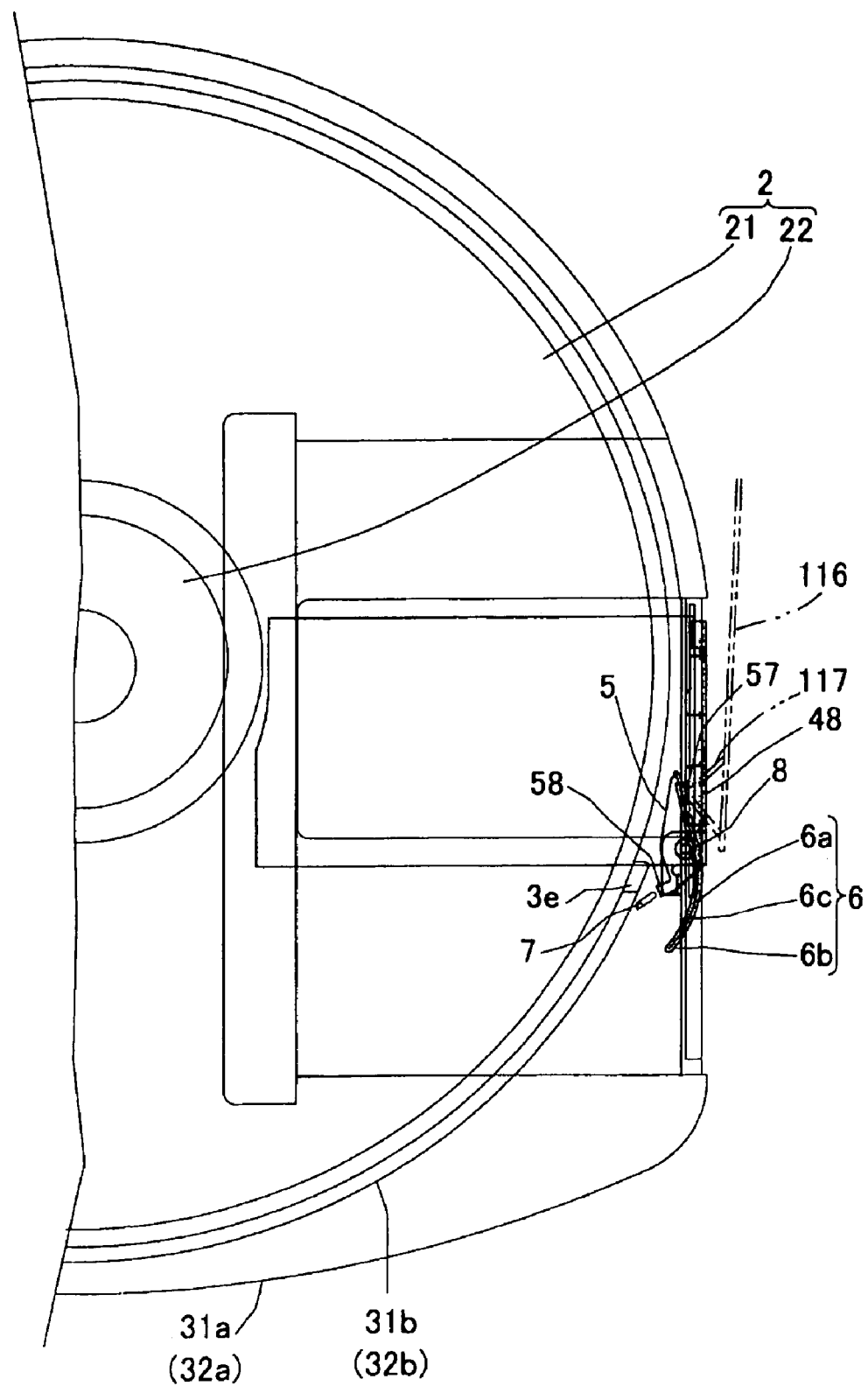
FIG. 13 is a plan view showing a principal part in a condition, in which the shutter is unlocked.

Referring to FIG. 12, in a condition, in which the shutter member 4 closes the recording and/or reproducing opening portion 34, the urge member 6 makes a leading end portion of the elastic displacement flap 6c press a pressed portion 57 disposed on the side of one end of the shutter movement restriction member 5. The urge member 6 thereby rotates the shutter movement restriction member 5 about a mounting shaft 8 in a clockwise direction. An engagement portion 58 disposed on the side of the other end of the shutter movement restriction member 5 is thus located at an engageable position relative to the movement restriction portion 3e disposed in the cartridge main body 3. When it is attempted in this condition to move the shutter member 4 in the direction of opening the recording and/or reproducing opening portion 34, the engagement portion 58 disposed on the side of the other end of the shutter movement restriction member 5 is engaged with the movement restriction portion 3e disposed in the cartridge main body 3, thereby preventing the shutter member 4 from moving. When the pressed portion 57 is pressed, in opposition to an urging force of the elastic displacement flap 6c, by a protruded portion 117 of the shutter lock release member 116 disposed on the second side surface plate 102c of the cartridge holder 102 to be described next, the shutter movement restriction member 5 rotates about the mounting shaft 8 in a counterclockwise direction as shown in FIG. 13. The engagement portion 58 is thereby escaped to a position, at which engagement with the movement restriction portion 3e is disabled. The shutter member 4 is thus allowed to move in the direction of opening the recording and/or reproducing opening portion 34.

Each of the disk-shaped recording medium 2, the cartridge main body 3, the shutter member 4, the shutter movement restriction member 5, the urge member 6, and the deformation preventive portion 7 will be described in detail.

Referring to FIG. 9, the disk-shaped recording medium 2 is formed by mounting a chucking hub 22 at a center of an optical disk 21 on which gaming software or the like is recorded. The optical disk 21 is formed to have a small diameter of about 50 mm. The chucking hub 22 is formed from a stainless steel or other magnetic metal attracted by a magnet.

The cartridge main body 3 is formed by making peripheral walls 31a, 32a of upper and lower halves 31, 32 abut against each other. Referring to FIG. 12, arcuate ribs 31b, 32b constituting the disk storage portion are disposed on an inside of the peripheral walls 31a, 32a.

Reference is made to FIG. 11. The cartridge main body 3 includes a front surface 3a (a side surface on the side of an insertion end to the disk recording and/or reproducing apparatus to be described later), right and left side surfaces (hereinafter referred to as first and second side surfaces) 3b, 3c, and a back surface 3d. The front surface 3a is formed into an arcuate surface (a semicircular surface) having substantially the same radius of curvature as the optical disk 21. The first and second side surfaces 3b, 3c, each continuing to the front surface 3a, are formed into flat surfaces that run in parallel with each other. The back surface 3d opposing the front surface 3a and continuing to the first and second side surfaces 3b, 3c is formed into a mildly continuing curved surface.

The lower half 32 includes a driving opening portion 33 disposed at a center thereof. The driving opening portion 33 allows the hub 22 of the disk-shaped recording medium 2 to face the outside. The lower half 32 also includes the recording and/or reproducing opening portion 34 disposed over an area covering from a point near the driving opening portion 33 to the second side surface 3c. The recording and/or reproducing opening portion 34 allows an information recording surface of the optical disk 21 to face the outside.

The hub 22 of the disk-shaped recording medium 2 is magnetically clamped onto a disk table 170 of the disk recording and/or reproducing apparatus 101 via the driving opening portion 33. An optical pickup 152 of the disk recording and/or reproducing apparatus 101 records and/or reproduces information relative to the optical disk 21 of the disk-shaped recording medium 2 via the recording and/or reproducing opening portion 34.

The disk cartridge 1 also includes a recessed step portion (hereinafter referred to as a first dent portion) 35 disposed in an area covering from an outer surface 32c of the lower half 32 to the peripheral wall of the second side surface 3c. The first dent portion 35 has the following functions. Specifically, the first dent portion 35 ensures that the shutter member 4 to be described next is mounted so as not to protrude from the outer surface 32b of the lower half 32 and the second side surface 3c; or more specifically, the first dent portion 35 ensures that the shutter member 4 is mounted flush with the outer surface 32c of the lower half 32 and an outer surface of the peripheral wall on the side of the second side surface 3c. Further, the first dent portion 35 restricts a movement range of the shutter member 4.

An end portion of the first dent portion 35 on the side of the driving opening portion 33 is formed as a second dent portion

36 that is even deeper than the first dent portion 35. A folded portion 44a disposed at a leading end of an opening open/close portion 44 of the shutter member 4 to be described next is inserted into the second dent portion 36. The second dent portion 36 is closed at a position upward of the folded portion 4a by a shutter guide plate 37 mounted to the lower half 32. Further, the shutter guide plate 37 prevents the folded portion 44a at the leading end of the opening open/close portion 44 from curving upward. The shutter guide plate 37 is also mounted in the lower half 32 in a condition, in which the shutter guide plate 37 remains flush with the outer surface of the lower half 32.

Figure 14:
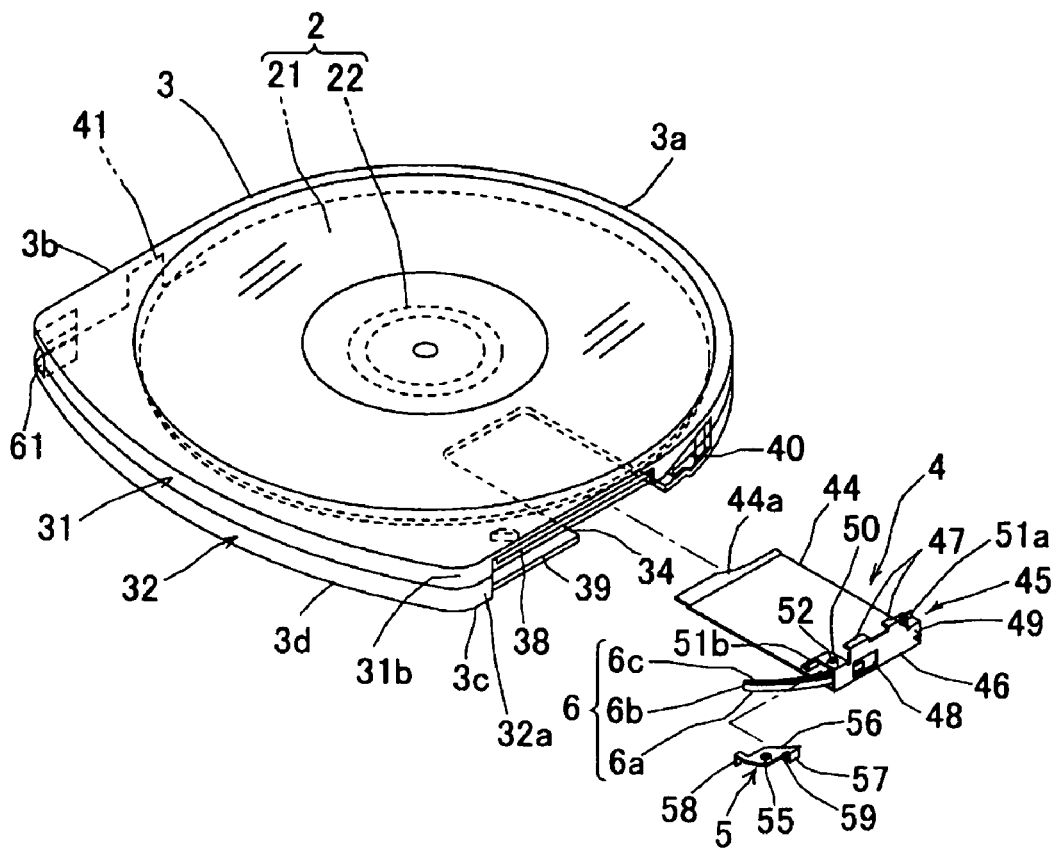
FIG. 14 is an exploded perspective view showing a condition before the shutter is installed.

Referring to FIG. 14, the upper half 31 includes a guide groove 38 that extends in a moving direction of the shutter member 4. The guide groove 38 is disposed in the peripheral wall 31a on the side of the second side surface 3c. In addition, the peripheral wall 32a on the side of the second side surface 3c of the lower half 32 is removed. This arrangement forms an opening portion 39 for shutter member guiding in a space formed with the peripheral wall 31a on the side of the second side surface 3c of the upper half 31.

Further, an area from the second side surface 3c to the front surface 3a of the cartridge main body 3 includes a shutter lock release member guide groove 40. The shutter lock release member guide groove 40 continues into the opening portion 39 for shutter member guiding. In addition, the other side surface of the cartridge main body 3, that is, the first side surface 3b includes a function enhancement groove 41 and the side pressure releasing recessed portion 61. The side pressure releasing recessed portion 61 functions as follows. Specifically, when storage of the disk cartridge 1 in the cartridge holder 102 is completed, the protruded portion 223 of the cartridge drop preventive means 221 fits into the recessed portion 61 and is kept in a noncontact condition with respect to the first side surface 3b of the cartridge main body 3. The side pressure releasing recessed portion 61 thereby releases a side pressure by the cartridge drop preventive means 221 on the cartridge holder 102.

Referring to FIG. 11, an outer surface of the lower half 32 on the side of the front surface 3a includes a pair of positioning holes 42, 43.

Referring to FIG. 14, the shutter member 4 includes the flat plate-like opening open/close portion 44 and an assembly portion 45. The opening open/close portion 44 closes the recording and/or reproducing opening portion 34. The assembly portion 45 is used for assembling the shutter member 4 to the cartridge main body 3 so that the shutter member 4 is movable between the position of opening the recording and/or reproducing opening portion 34 and the position of closing the recording and/or reproducing opening portion 34 with the opening open/close portion 44 overlapped with the first dent portion 35 of the lower half 32.

The assembly portion 45 includes a first movement guide flap 46 and a second movement guide flap 47. The first movement guide flap 46 is formed by bending the side of one end of the opening open/close portion 44 substantially at a right angle. The second movement guide flap 47 is formed by bending a leading end portion of the first movement guide flap 46 substantially at a right angle so as to run in the same direction as the opening open/close portion 44.

The first movement guide flap 46 includes an opening portion 48 for pressing operation at a central portion thereof. The pressed portion 57 of the shutter movement restriction member 5 to be next described in detail faces this opening portion 48. The first movement guide flap 46 also includes third and fourth movement guide flaps 49, 50 disposed on both sides in the shutter movement direction and at substantially a central portion in a thickness direction of the cartridge main body 3. The third and fourth movement guide flaps 49, 50 run substantially in parallel with the second movement guide flap 47. The third and fourth movement guide flaps 49, 50 also include lock tabs 51a, 51b at leading end portions thereof, respectively. The lock tabs 51a, 51b extend in a direction of leaving away from the opening open/close portion 44. There is disposed a boss-shaped shaft portion 52 on a lower surface of the fourth movement guide flap 50. The shaft portion 52 allows the shutter movement restriction member 5 to be mounted rotatably. An end portion of the opening open/close portion 44 opposite to the assembly portion 45 includes the folded portion 44a for upward curving prevention. The shutter member 4 is formed by bending a metal plate blanked to a predetermined shape.

Figure 16:
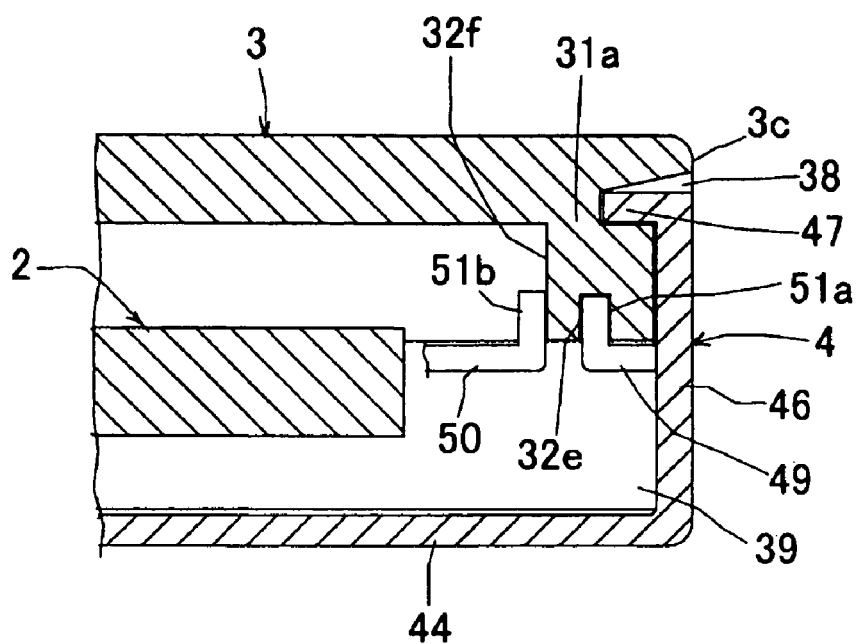
FIG. 16 is a cross-sectional view showing a condition, in which the shutter is installed.

Referring to FIG. 16, the shutter member 4 is slidably mounted on the side of the second side surface 3c of the cartridge main body 3 as detailed in the following. Specifically, the first movement guide flap 46 is aligned with the shutter Rick release member guide groove 40 in the second side surface 3c of the cartridge main body 3. The second movement guide flap 47 is then inserted into the guide groove 38 included in the upper half 31. The third and fourth movement guide flaps 49, 50 are inserted into the cartridge main body 3 through the opening portion 39 for guiding the shutter member. The lock tab 51a disposed on the leading end of the third movement guide flap 49 is then engaged with a groove 32e included in a bottom surface of the peripheral wall 31a of the upper half 31. The lock tab 51b disposed on the leading end of the fourth movement guide flap 50 is engaged with an inner surface 32f of the peripheral wall 31a of the upper half 31.

Referring to FIG. 10, when the shutter member 4 is slid toward the side of the front surface 3a of the cartridge main body 3, the opening open/close portion 44 closes the recording and/or reproducing opening portion 34. Referring this time to FIG. 11, when the shutter member 4 is slid toward the side of the front surface 3a of the cartridge main body 3, the opening open/close portion 44 opens the recording and/or reproducing opening portion 34.

Figure 15:
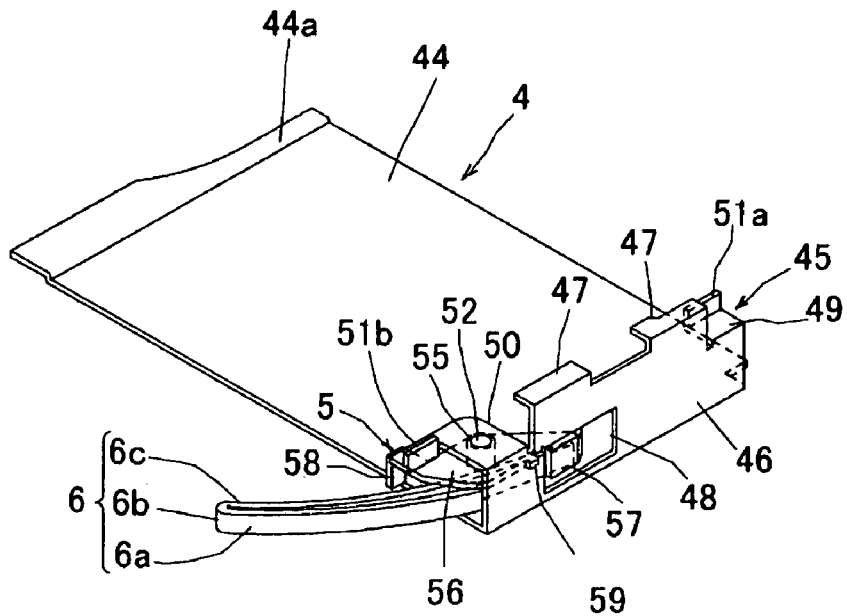
FIG. 15 is a perspective view showing a condition, in which a shutter movement restriction member is mounted on the shutter.

Reference is now made to FIGS. 14 and 15. The shutter movement restriction member 5 includes a flat plate-like main body portion 56, the pressed portion 57, and the engagement portion 58. The main body portion 56 includes a bearing hole 55 located at a central portion thereof. The pressed portion 57 is located at one end portion of the main body portion 56. The engagement portion 58 is located at the other end portion of the main body portion 56. The shutter movement restriction member 5 further includes a protruded portion 59 for inhibiting rotation disposed on the end portion thereof, in which the pressed portion 57 of the main body 56 is provided. The pressed portion 57 and the engagement portion 58 are formed by bending one end portion and the other end portion of the main body portion 56 substantially at a right angle in the same direction. The shutter movement restriction member 5 is formed by bending a metal plate blanked to a predetermined shape.

The shutter movement restriction member 5 is rotatably mounted in the fourth movement guide flap 50 by inserting the boss-shaped shaft portion 52 on the fourth movement guide flap 50 of the shutter member 4 in the bearing hole 55. When the shutter movement restriction member 5 is rotated until the protruded portion 59 for inhibiting rotation abuts on the inner surface of the first movement guide flap 46 of the shutter member 4, the pressed portion 56 faces the opening portion 48 for pressing operation disposed at the central portion of the first movement guide flap 46 of the shutter member 4 as shown in FIG. 11. At the same time, referring to FIG. 12, the engagement portion 58 becomes engageable with the movement restriction portion 3e disposed on the cartridge main body 3, thus inhibiting the shutter member 4 from moving.

As described earlier, the urge member 6 includes the extension flap 6a and the elastic displacement flap 6c. The extension flap 6a is extended from one side of the shutter member 4. The elastic displacement flap 6c is formed by folding back the extension flap 6a via the fold back portion 6b disposed at the leading end portion of the extension flap 6a. (See FIG. 14.)

The extension flap 6a is formed by being curved so as to advance into the cartridge main body 3 through the opening portion 39 for guiding the shutter member when the shutter member 4 is assembled in the cartridge main body 3. The elastic displacement flap 6c is folded back in a curved condition so as to overlap the inner surface of the extension flap 6c. The leading end portion of the elastic displacement flap 6c is to press the pressed portion 57 disposed on the side of one end of the shutter movement restriction member 5, thus causing the pressed portion 57 to face the opening portion 48 for pressing operation disposed at the central portion of the first movement guide flap 46 of the shutter member 4. The extension flap 6a makes the elastic displacement flap 6c long, thereby allowing spring constant of the urge member 6 to be adjusted.

Figure 17:
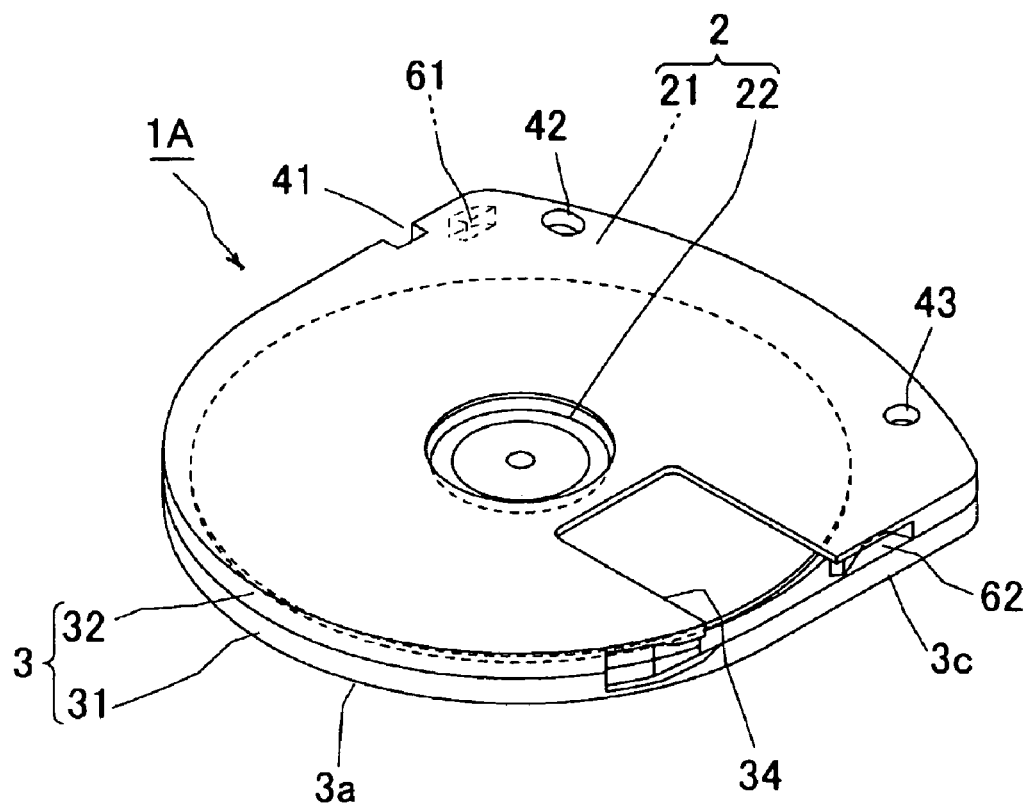
FIG. 17 is a perspective view showing a disk cartridge not including a shutter.

FIG. 17 is a view showing a disk cartridge according to another embodiment of the present invention. According to this embodiment of the present invention, a disk cartridge 1A adopts what is called a shutter-less structure having no shutter member 4. The shutter-less disk cartridge 1A includes a function enhancement groove 41 and a first side pressure releasing recessed portion 61. The function enhancement groove 41 is disposed in a first side surface 3b of a cartridge main body 3. The side pressure releasing recessed portion 61 functions as follows. Specifically, when storage of the disk cartridge 1 in a cartridge holder 102 is completed, a protruded portion 223 of a cartridge drop preventive means 221 fits into the recessed portion 61 and is kept in a noncontact condition with respect to the first side surface 3b of the cartridge main body 3 of the disk cartridge 1. The side pressure releasing recessed portion 61 thereby releases a side pressure by the cartridge drop preventive means 221 on the cartridge holder 102. It should be noted herein that the function enhancement groove 41 is formed closer to the side of an insertion end as compared with the first side pressure releasing recessed portion 61. In addition, a second side surface 3c includes a second side pressure releasing recessed portion 62. The second side pressure releasing recessed portion 62 functions as follows. Specifically, when storage of the disk cartridge 1 in the cartridge holder 102 is completed, a protruded portion 117 at a leading end of a shutter lock release member 116 disposed on a second side surface plate 102c of a cartridge holder 102 to be described next fits into the recessed portion 62 and is kept in a noncontact condition with respect to the second side surface 3c of the cartridge main body 3 of the disk cartridge 1. The second side pressure releasing recessed portion 62 thereby removes a side pressure by the shutter lock release member 116 on the cartridge holder 102. This embodiment is identical to the disk cartridge 1 including the shutter member 4 described heretofore in the rest of the structures and the same description is not repeated.

(3) Construction of the Cartridge Holder

Referring to FIG. 3, the cartridge holder 102 includes an upper surface plate (top surface plate) 102a, the right and left side surface plates (hereinafter referred to as the first and second side surface plates) 102b, 102c, a pair of right and left cartridge support portions 102d, 102e, and receiving surface portions 102f, 102g. The upper surface plate 102a is substantially a square. The first and second side surface plates 102b, 102c are formed by bending right and left side portions of the upper surface plate 102a downwardly substantially at a right angle. The cartridge support portions 102d, 102e are formed by bending lower ends of the first and second side surface plates 102b, 102c inwardly substantially at a right angle. The cartridge support portions 102d, 102e support right and left side portions on the lower surface of the disk cartridge 1 inserted in the cartridge holder 102. The receiving surface portions 102f, 102g are formed by bending front ends of the cartridge support portions 102d, 102e downwardly. The upper surface plate 102a, the first and second side surface plates 102b, 102c, the pair of right and left cartridge support portions 102d, 102e, and the like constitute an insertion port 102k of the disk cartridge 1 and a storage portion that continues thereto. A bridge plate 102m is attached at a position closer to the insertion port of the pair of right and left cartridge support portions 102d, 102e. The bridge plate 102m is attached so as to cross over the cartridge support portions 102d, 102e. The bridge plate 102m serves as reinforcement for preventing the pair of cartridge support portions 102d, 102e from being easily deformed. The bridge plate 102m also functions to prevent the disk cartridge 1 from jumping out from a space between the pair of cartridge support portions 102d, 102e.

The upper surface plate 102a has a hexagonal opening portion 111 blanked at a center thereof. The opening portion 111 is for reducing weight of the cartridge holder 102.

A pair of right and left, or first and second flat springs 112, 113 is disposed on both sides of the opening portion 111. The first and second flat springs 112, 113 are bent so as to advance into the storage portion from the insertion port 102k. The first and second flat springs 112, 113 are as such designed to press an upper surface of the disk cartridge 1 inserted into the storage portion, thereby pressing the disk cartridge 1 against the cartridge support portions 102d, 102e. In addition, a pair of right and left, or third and fourth flat springs 114, 115 is disposed on the side of a front end of the opening portion 111. The third and fourth flat springs 114, 115 are bent upwardly toward an upper side of the upper surface plate 102a. The third and fourth flat springs 114, 115 are designed to permit easy insertion, assembly, or a related task performed for the cartridge holder 102 relative to a cartridge holder storage portion or the like of an electronic apparatus. The first through fourth flat springs 112 to 115 are formed by blanking part of the upper surface plate 102a of the disk cartridge 1.

Figure 5:
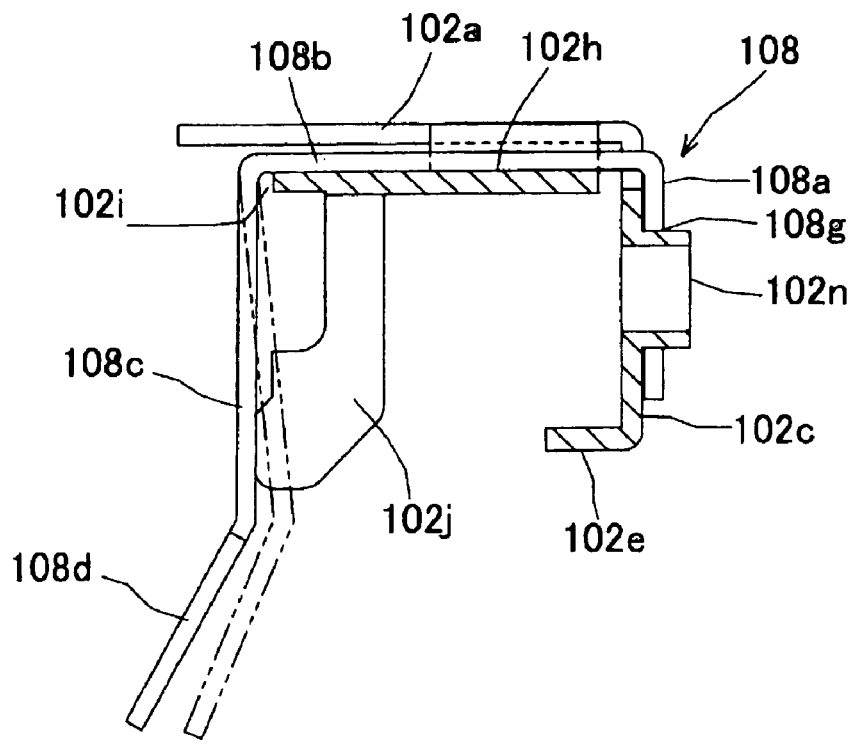
FIG. 5 is a cross-sectional view showing the lock release means in its mounted condition.

The recessed lock release means mounting portion 102h is formed in the following space. The space is specifically between the second flat spring 113 and the second side surface plate 102c of the cartridge holder 102, and between the arcuate front surface 3a of the disk cartridge 1 inserted in the cartridge holder 102 and the second side surface plate 102c of the cartridge holder 102. The space is what is called a dead space. Referring to FIG. 5, two cylindrical boss-shaped protrusions 102n are formed on the second side surface plate 102c of the cartridge holder 102 facing the lock release means mounting portion 102h. The lock release means 108 is mounted through the following mounting steps in the substantially triangular dead space formed by the disk cartridge 1 inserted in the cartridge holder 102, and the arcuate front surface 3a and the side surface 3c of the cartridge main body 3. Specifically, the boss-shaped protrusions 102n are inserted in protrusion fitting holes 108g in the mounting portion 108a. An overlapping portion 108b is overlapped with the upper surface of the lock release means mounting portion 102h. The elastic flap portion 108c and the eject lever operating portion 108d are then inserted in the cartridge holder 102 and leading end portions of the boss-shaped protrusions 102n are then caulked to enlarge diameters thereof.

As shown in FIG. 3, the second side surface plate 102c of the cartridge holder 102 is mounted with the shutter lock release member 116 for releasing locking of the shutter member 4 by the shutter movement restriction member 5 of the disk cartridge 1.

The lock release member 116 is formed from a flat spring. Like the mounting portion 108a of the lock release means 108, the lock release member 116 is immovably attached to the second side surface plate 102c of the cartridge holder 102. The side on one end portion of the lock release member 116 in a length direction is secured by the boss-shaped protrusions 102n disposed on the second side surface plate 102c of the cartridge holder 102. The lock release member 116 extends along the second side surface plate 102c of the cartridge holder 102 up to a point near the cartridge insertion port. A protruded portion 117 having substantially a V shape in a plan view is disposed on a leading end portion of the lock release member 116. The protruded portion 117 advances into the cartridge holder 102 through a cutout window 118 provided in the second side surface plate 102c of the cartridge holder 102. Referring to FIG. 13, when the disk cartridge 1 is inserted into the cartridge holder 102 a predetermined amount, the protruded portion 117 at the leading end of the shutter Rick release member 116 presses the pressed portion 57 of the shutter movement restriction member 5, thus unlocking the shutter member 4.

The cartridge drop preventive means 221 is disposed on the first side surface plate 102b of the cartridge holder 102. As previously touched upon, when storage of the disk cartridge 1 in the cartridge holder 102 is completed, the protruded portion 223 disposed at the leading end portion of the cartridge drop preventive means 221 fits into the recessed portion 61 for releasing the first side pressure disposed in the first side surface 3b of the disk cartridge and is kept in a noncontact condition with respect to the first side surface 3b of the disk cartridge 1 as shown in FIGS. 29A and 29B.

The pair of right and left cartridge support portions 102d, 102e of the cartridge holder 102 includes a pair of positioning holes 118. Positioning pins 119 included in the chassis 103 to be described next are inserted in these positioning holes 118.

The first and second side surface plates 102b, 102c of the cartridge holder 102 include bearing holes 121, 122 disposed on an end portion on a side opposite to the cartridge insertion port. The bearing holes 121, 122 serve the purpose of mounting the cartridge holder 102 rotatably in the chassis 103 to be described next.

(4) Construction of the Chassis

The chassis 103 is formed substantially into a rectangle from a metal plate. The chassis 103 includes damper mounting portions 131 disposed at four corners thereof. Rubber dampers 132 are fitted in these damper mounting portions 131. The chassis 103 includes right and left side walls 133, 134 located outside the first and second side surface plates 102b, 102c, respectively, of the cartridge holder 102. The side walls 133, 134 include a pair of bearing portions 135, 136 for rotatably mounting the cartridge holder 102. The bearing portions 135, 136 are located on the side of one end of the side walls 133, 134. Shafts 137 disposed on inner surfaces of the bearing portions 135, 136 are inserted into the bearing holes 121, 122 in the cartridge holder 102. The cartridge holder 102 is thereby supported rotatably between the cartridge insertion/removal position and the recording/reproducing position.

The chassis 103 includes the positioning pins 120 that fit into the positioning holes 119 included in the right and left cartridge support portions 102d, 102e of the cartridge holder 102 when the cartridge holder 102 is moved to the recording/reproducing position.

(5) Construction of the Recording and/or Reproducing Means

Referring to FIG. 3, the recording and/or reproducing means 104 includes a spindle motor 151, the optical pickup 152, and a sled motor 153. The spindle motor 151 rotates the disk-shaped recording medium 2 of the disk cartridge 1. The optical pickup 152 records and/or reproduces information to and from the disk-shaped recording medium 2. The sled motor 153 drives the optical pickup 152.

Figure 18:
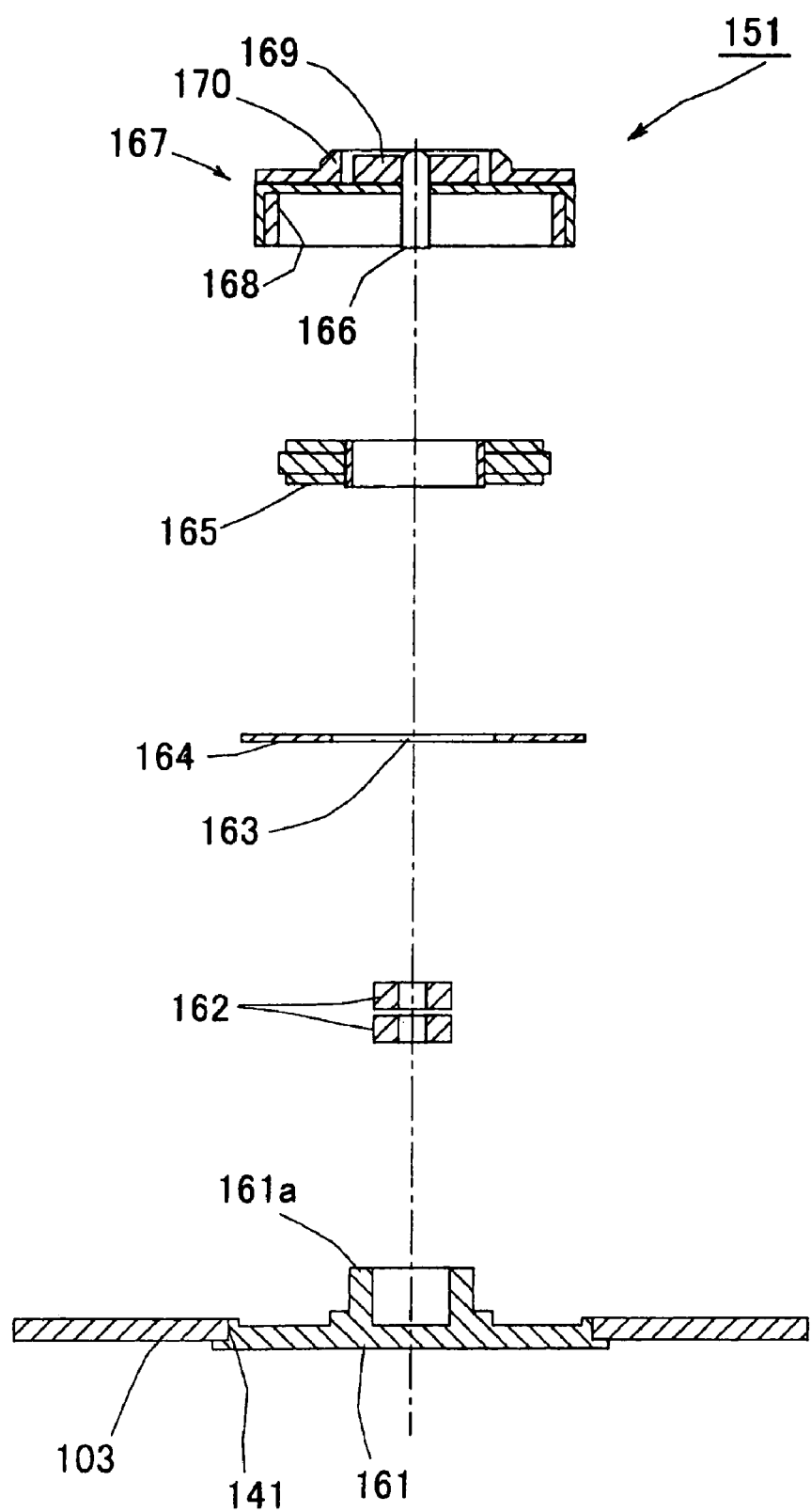
FIG. 18 is an exploded cross-sectional view showing a spindle motor.

Referring to FIG. 18, the spindle motor 151 includes a stator board 161, a bearing portion 161a, a bearing 162, a wiring board 164, an iron core coil 165, and a rotor assembly 167. The stator board 161 is a synthetic resin outsert-molded in a stator board forming hole 141 for the spindle motor (hereinafter referred to as a first stator board forming hole) disposed in the chassis 103. The bearing portion 161a is a tubular element integrally molded on an upper surface of the stator board 161. The bearing 162 is mounted in an inner periphery of the bearing portion 161a. The wiring board 164 is placed and held on the stator board 161 with the tubular bearing portion 161a inserted in a central hole 163. The iron core coil 165 is mounted on an outer peripheral portion of the tubular bearing portion 161a. The rotor assembly 167 is rotatably mounted with a leading end of a rotational central shaft 166 inserted in the bearing 162. A rotor magnet 168 paired with the iron core coil 165 is mounted on an inner peripheral surface of the rotor assembly 167. A disk table 170 is mounted on an upper surface of the rotor assembly 167. The disk table 170 uses a magnet 169 for magnetically clamping the hub 22 of the disk-shaped recording medium 2.

Referring to FIG. 3, the optical pickup 152 includes an objective lens driving apparatus 171 and a carrier rack 172. The carrier rack 172 moves the objective lens driving apparatus 171 in a radial direction of the disk-shaped recording medium 2 of the disk-shaped recording medium 2.

The carrier rack 172 includes a first bearing portion 173 and a second bearing portion 174. The first bearing portion 173 is mounted with a lead screw 175. The second bearing portion 174 includes a guide portion 176.

The lead screw 174 is rotatably supported by a pair of bearings 177 on the side of a lower surface of the chassis 103. The guide portion 176 is integrally formed with the chassis 103 through outsert molding.

A worm gear 181 is mounted on one end of the lead screw 175. Referring to FIG. 2, the worm gear 181 is in mesh with a third gear 183 rotatably mounted through a shaft 182 on the lower surface of the chassis 103.

The third gear 183 includes a second gear 184 disposed on a lower end portion thereof and mounted coaxially therewith. The second gear 184 has a larger diameter than the third gear 183. The second gear 184 is rotatably driven by the sled motor 153 through a first gear 185 to be described next.

Figure 19:
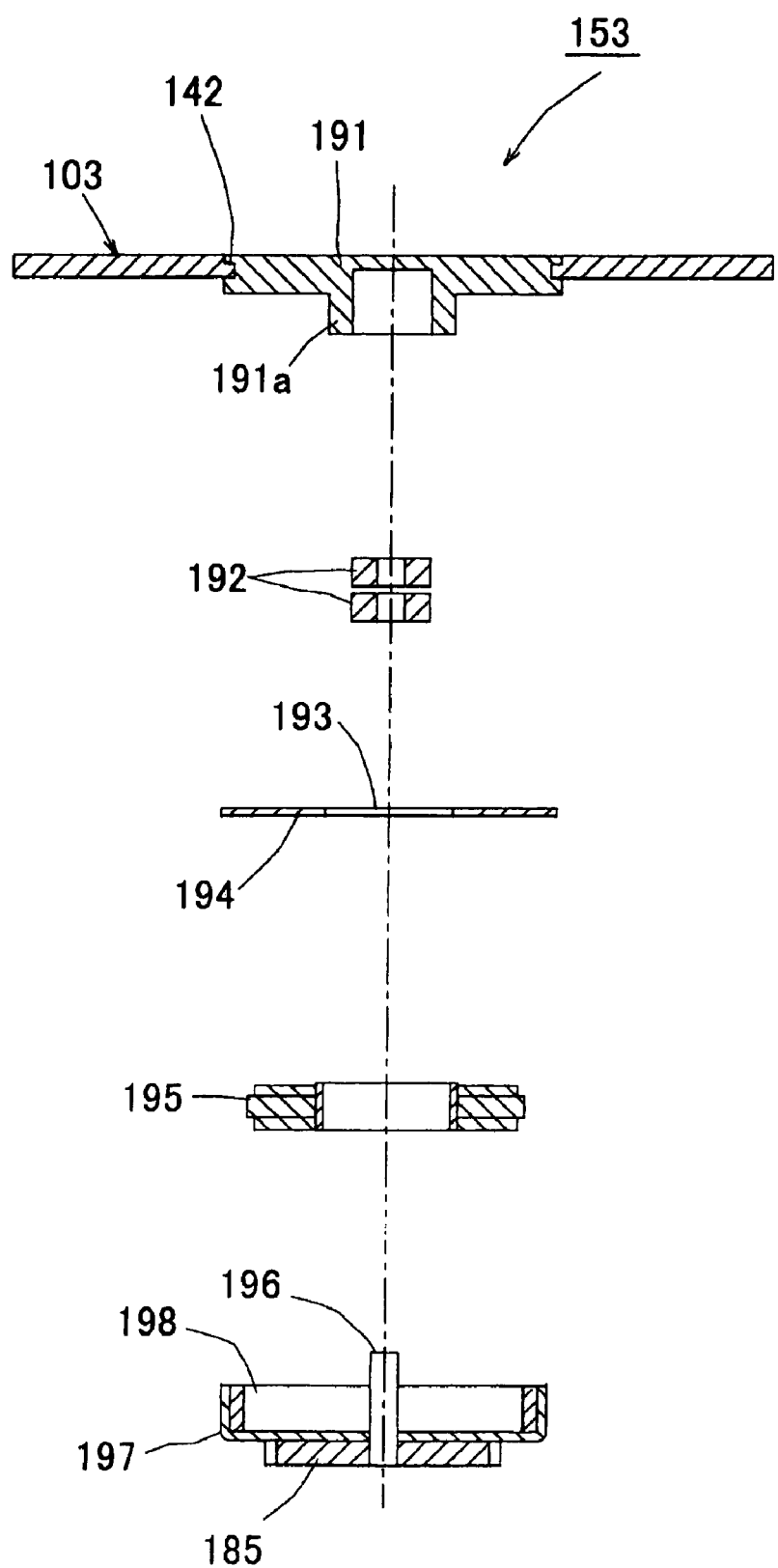
FIG. 19 is an exploded cross-sectional view showing a sled motor.

Referring to FIG. 19, the sled motor 153 includes a stator board 191, a bearing portion 191a, a bearing 192, a wiring board 194, an iron core coil 195, and a rotor assembly 197. The stator board 191 is a synthetic resin outsert-molded in a stator board forming hole for the sled motor (hereinafter referred to as a second stator board forming hole) provided in the chassis 103. The bearing portion 191a is a tubular element integrally molded on an upper surface of the stator board 191. The bearing 192 is mounted in an inner periphery of the bearing portion 191a. The wiring board 194 is placed and held on the stator board 191 with the tubular bearing portion 191a inserted in a central hole 193. The iron core coil 195 is mounted on an outer peripheral portion of the tubular bearing portion 191a. The rotor assembly 197 is rotatably mounted with a leading end of a rotational central shaft 196 inserted in the bearing 192. A rotor magnet 198 paired with the iron core coil 195 is mounted on an inner peripheral surface of the rotor assembly 167. In addition, the first gear 185 is mounted on the lower surface of the rotor assembly.

Reference is now made to FIG. 2. When the sled motor 153 rotates the lead screw 175 through the first gear 185, the second gear 184, the third gear 183, and the worm gear 181, the carrier rack 172 is guided by the guide portion 176 and moved in the pickup disposition hole 143. The carrier rack 172 thereby moves the objective lens driving apparatus 171 in the radial direction of the disk-shaped recording medium 2 of the disk-shaped recording medium 2.

(6) Construction of the Eject Lever

When the disk cartridge 1 is inserted, the eject lever 105 is pushed by the front surface 3a of the cartridge main body 3, rotating by counteracting the urging force of the urge means 106 to be described next. The eject lever 105 is then locked by the eject lever lock means 107 to be described later so as not to be rotated backward. After recording and/or reproducing has been completed, the lock release means 108 described earlier releases locking of the eject lever 105 by the eject lever lock means 107. This causes the eject lever 105 to be rotated backward by the urging force of the urge means 106, which unloads the disk cartridge 1 from the cartridge holder 102.

Referring to FIG. 3, the eject lever 105 includes a substantially V-shaped flat plate-like main portion 105a, a pressed portion 105c, a bearing hole 105d, and an operated portion 105e. The flat plate-like main portion 105a is to be overlapped with the upper surface of the chassis 103. The pressed portion 105c is disposed on the side of one end of the flat plate-like main portion 105a via an arm portion 105b. The pressed portion 105c is pressed by the front surface 3a of the cartridge main body 3. The bearing hole 105d is disposed on the side of the other end of the flat plate-like main portion 105a. The operated portion 105e is disposed at a position substantially symmetrical with respect to the pressed portion 105c across the bearing hole 105d. The operated portion 105e is operated for releasing locking by the eject lever operating portion 108d of the lock release means 108.

The eject lever 105 is mounted on the upper surface of the chassis 103 rotatably by a shaft 105f. A central portion of the front surface 3a of the cartridge main body 3 of the disk cartridge 1 inserted into the cartridge holder 102 is to abut against the pressed portion 105c. In addition, the eject lever 105 is mounted on the upper surface of the chassis 103 such that the flat plate-like main portion 105a is raised by the shaft 105f to a position, at which locking by the eject lever lock means 107 can be released.

Figure 8A:
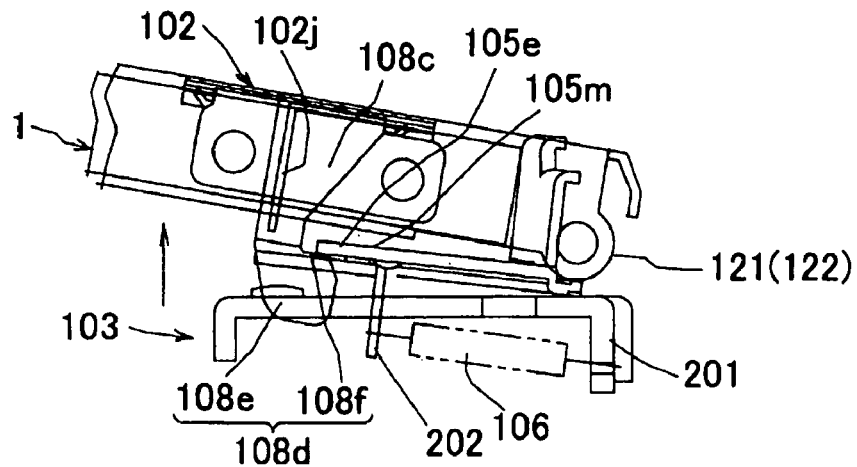
FIG. 8A is a side elevational view showing a condition, in which the engagement portion raises the lower surface of the operated portion of the eject lever and locking of the eject lever by eject lever lock means is thereby released.
Figure 8B:
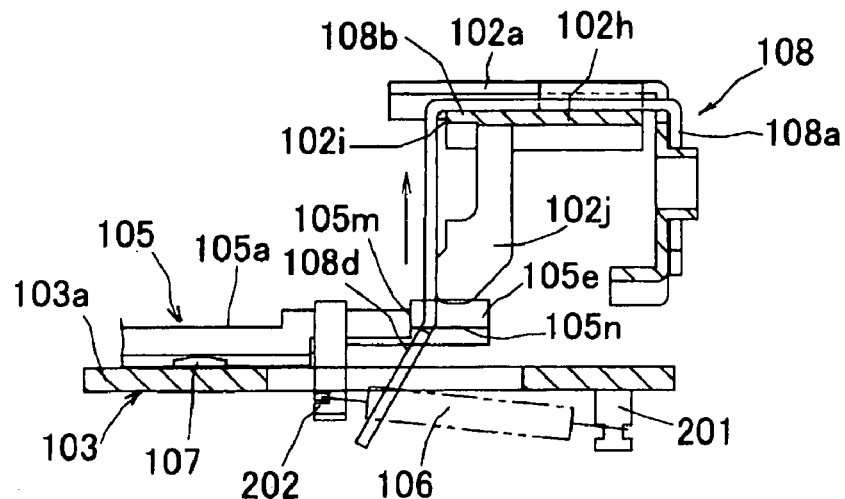
FIG. 8B is a front view showing the same.
Figure 8C:
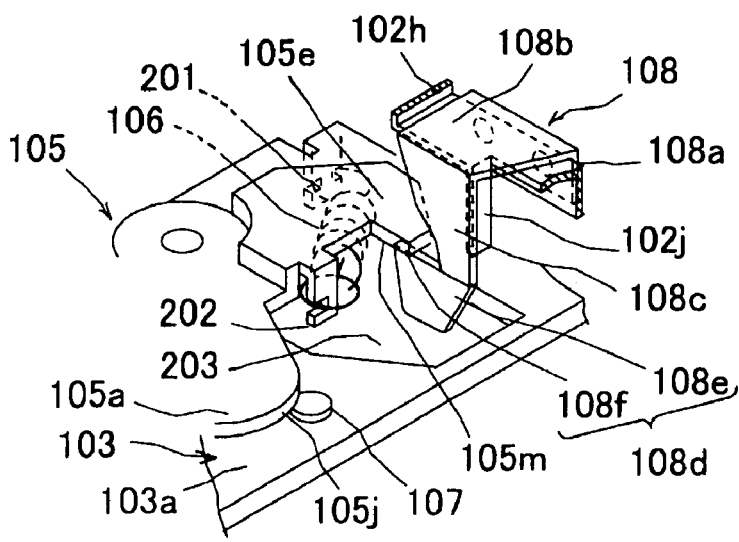
FIG. 8C is a perspective view showing the same.
Figure 20:
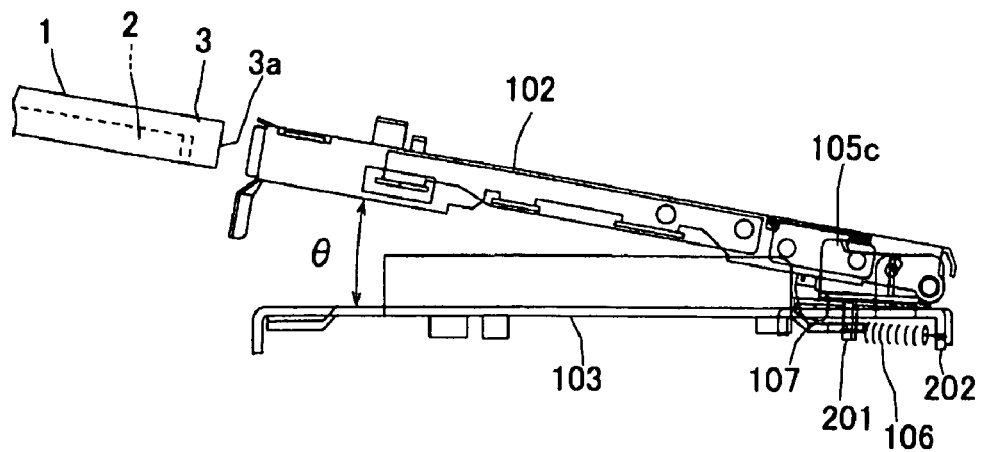
FIG. 20 is a side elevation view showing a condition, in which a cartridge holder is placed at a cartridge insertion/removal position.
Figure 21:
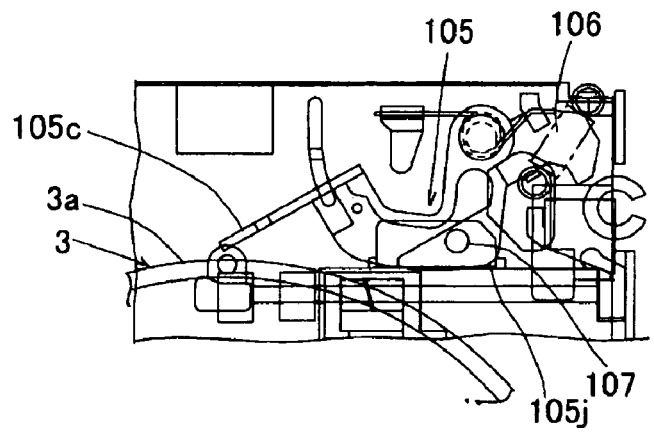
FIG. 21 is a plan view showing a condition before the eject lever is pushed.
Figure 22:
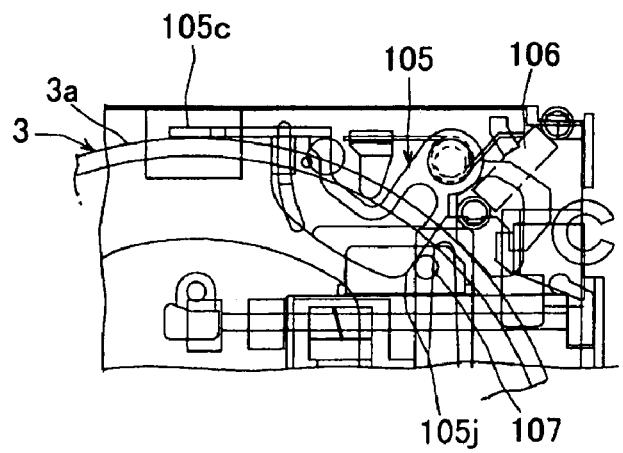
FIG. 22 is a plan view showing a condition after the eject lever is pushed.

The eject lever 105 is constructed as described in the foregoing. When the disk cartridge 1 is inserted in the cartridge holder 102 in the cartridge insertion/removal position (in a condition, in which the cartridge holder 102 is inclined at a predetermined inclined angle θ relative to the chassis 103) as shown in FIG. 20, the front surface 3a of the cartridge main body 3 presses the pressed portion 105c, causing the eject lever 105 to counteract the urging force of the urge means 106 to be described next and rotate as shown in FIG. 21. When the disk cartridge 1 is entirely accommodated in the cartridge holder 102, the eject lever lock means 107 to be described next engages an outer side surface 105j of the pressed portion 105e, thus locking the eject lever 105 so as not to be rotated backward as shown in FIG. 22. In this condition, the cartridge holder 102 is kept in a condition of not being able to rotate backward even if the cartridge holder 102 is rotated to the recording/reproducing position. When the cartridge holder 102 is rotated from the recording/reproducing position to the cartridge insertion/removal position after recording and/or reproducing has been completed, the lock release means 108 releases locking of the eject lever 105 by the eject lever lock means 107 as shown in FIGS. 8A, 8B, and 8C. Accordingly, the eject lever 105 is rotated backward by the urging force of the urge means 106, thus unloading the disk cartridge 1 from the cartridge holder 102.

(7) Construction of the Urge Means and the Eject Lever Lock Means

The urge means 106 gives the eject lever 105 a rotational force in the disk cartridge unloading direction. The urge means 106 also gives an urging force to pull the eject lever 105 in a direction of approaching the chassis 103.

Reference is now made to FIGS. 6A through 6C, 7A through 7C, and 8A through 8C. A coil spring is used for the urge means 106. The urge means 106 is disposed on the side of the lower surface of the chassis 103. One end of the urge means 106 is hooked onto a first spring latch portion 201 disposed in the chassis 103. The other end of the urge means 106 is hooked onto a second spring latch portion 202 disposed in the eject lever 105. The second spring latch portion 202 protrudes downwardly to the side of the lower surface of the chassis 103 through a cutout hole portion 203 included in the chassis 103.

When the eject lever 105 is rotated by counteracting the urge means 106 to a position, in which the disk cartridge 1 is entirely accommodated in the cartridge holder 102, the eject lever lock means 107 engages the outer side surface 105j of the flat plate-like main portion 105a of the eject lever 105, thus locking the eject lever 105 so as not to be rotated backward.

The eject lever lock means 107 is formed by disposing a boss-shaped protruded portion on the upper surface of the chassis 103. When the flat plate-like main portion 105a of the eject lever 105 is lifted off the chassis 103 by counteracting the urging force of the urge means 106, the eject lever lock means 107 is designed to be disengaged from the outer side surface 105j. The eject lever 105, as disengaged from the eject lever lock means 107, rotates with the flat plate-like main portion 105a thereof riding on the eject lever lock means 107. The disk cartridge 1 is thereby unloaded from the cartridge holder 102. The lock release means 108 functions to bring the outer side surface 105j of the flat plate-like main portion 105a of the eject lever 105 into a position, in which the outer side surface 105j is lifted off the chassis 103, by overcoming the urging force of the urge means 106.

(8) Construction of the Lock Release Means

The lock release means 108 is formed from a flat spring separately from the cartridge holder 102. The lock release means 108 is mounted to the cartridge holder 102.

Figure 4:
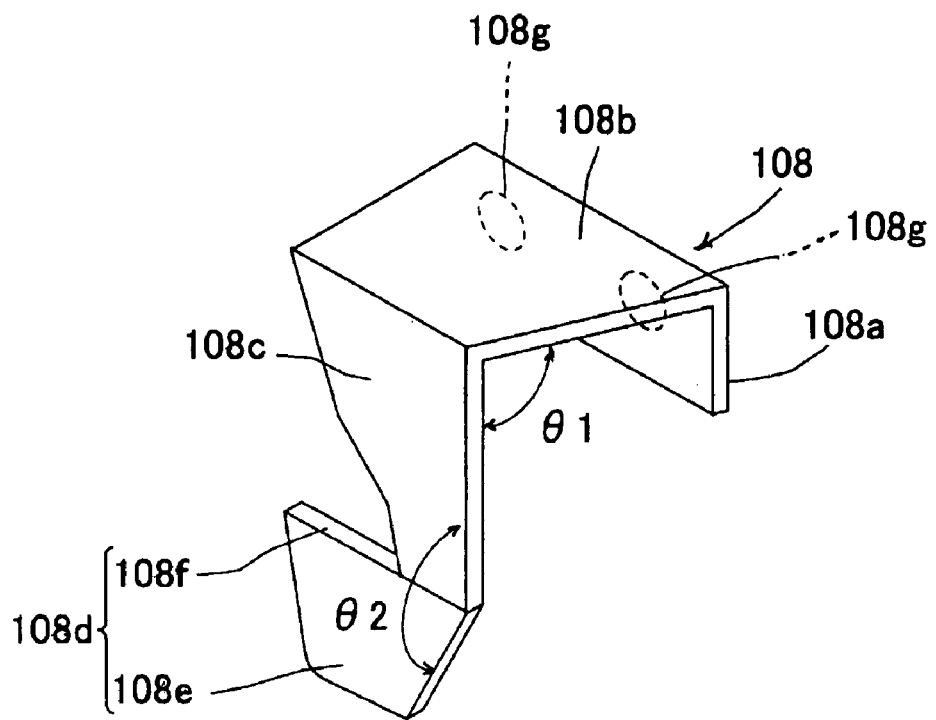
FIG. 4 is a perspective view showing lock release means.

Referring to FIGS. 1, 4, and 5, the lock release means 108 includes the mounting portion (an immovably attaching portion) 108a, the overlapping portion 108b, the elastic flap portion 108c, and the eject lever operating portion 108d. More specifically, the mounting portion 108a is secured (immovably attached) to a side surface of the cartridge holder 102. The overlapping portion 108b continues from the mounting portion 108a in a condition bent substantially at a right angle therewith and overlaps an upper surface of the lock release means mounting portion 102h formed by indenting the upper surface 102a of the cartridge holder 102. The elastic flap portion 108c continues from the overlapping portion 108b in a condition bent at an acute angle θ1 (approximately 80°) relative thereto. The elastic flap portion 108c then enters the cartridge holder 102 through a cutout window portion 102i provided in the upper surface 102a of the cartridge holder 102 and extends toward the side of the chassis 103. The eject lever operating portion 108d continues from the elastic flap portion 108c in a condition bent at an obtuse angle θ2 (approximately 160°) relative thereto.

The eject lever operating portion 108d includes an inclined surface portion 108e and an engagement portion 108f. The inclined surface portion 108e is pressed by a side surface 105m of the operated portion 105e of the eject lever 105 to be described later in detail so as to deflect the elastic flap portion 108c. The engagement portion 108f engages a lower surface 105n of the operated portion 105e when the elastic flap portion 108c makes a return motion as the inclined surface portion 108e is released from pressure by the side surface 105m of the operated portion 105e.

Referring to FIG. 5, the elastic flap portion 186c is what is called preloaded by being bent at substantially a right angle by being pressed by an elastic flap positioning portion 102j disposed on a lower surface of the lock release means mounting portion 102h. The elastic flap portion is also positioned at a predefined position. The lock release means 108 is formed by bending a flat spring stock blanked to a predetermined shape.

Figure 6A:
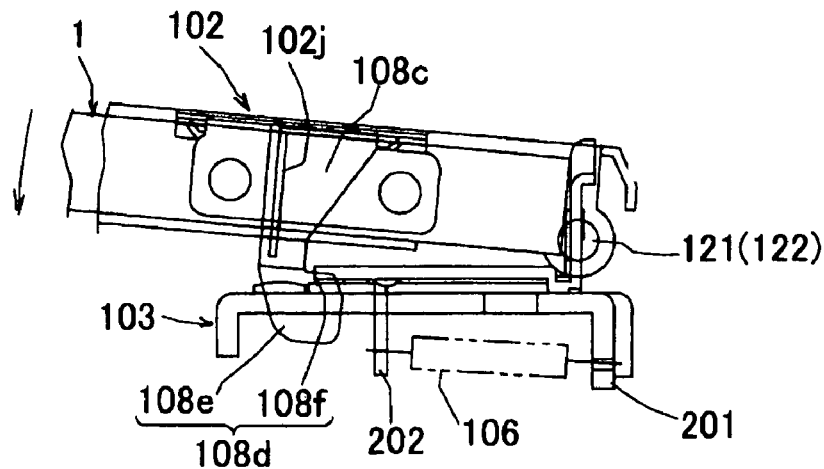
FIG. 6A is a side elevational view showing a condition, in which a side surface of an operated portion of an eject lever contacts an inclined surface portion of the lock release means.
Figure 6B:
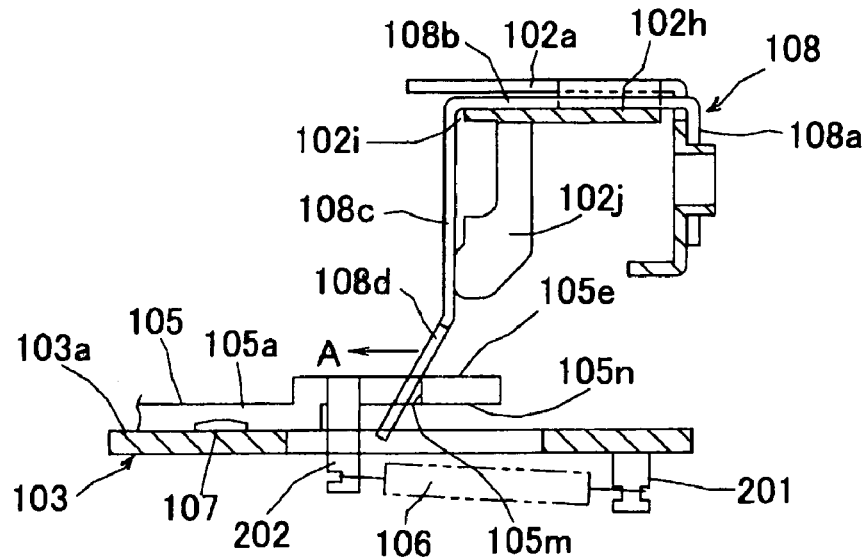
FIG. 6B is a front view showing the same.
Figure 6C:
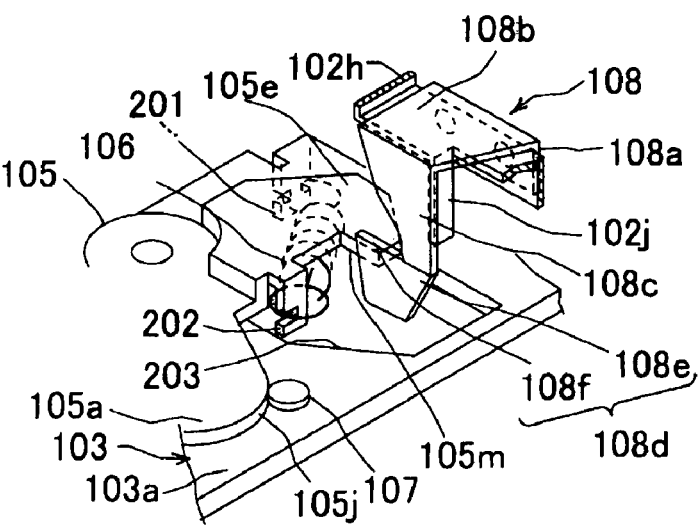
FIG. 6C is a perspective view showing the same.
Figure 7A:
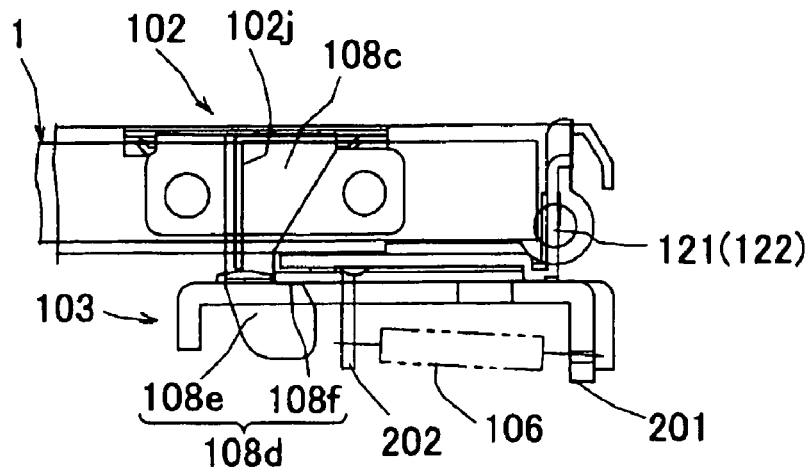
FIG. 7A is a side elevational view showing a condition, in which an elastic flap portion elastically returns to cause an engagement portion to be engaged with a lower surface of the operated portion of the eject lever.
Figure 7B:
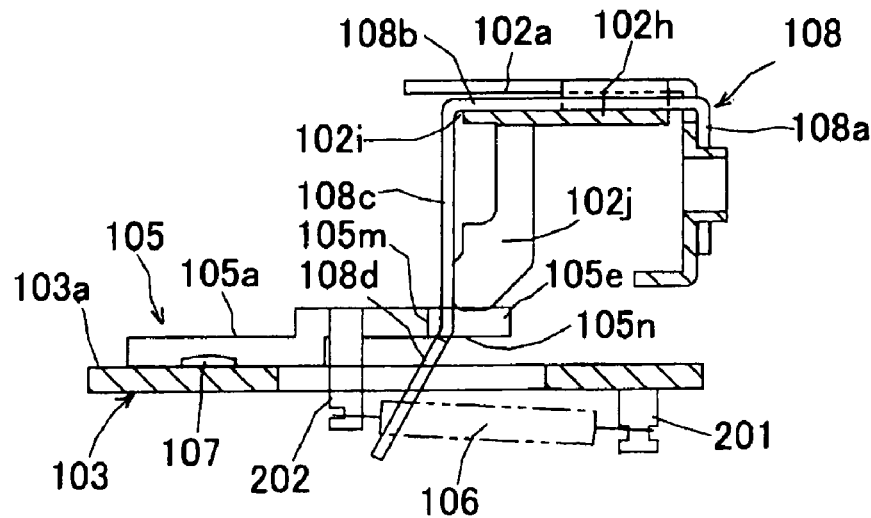
FIG. 7B is a front view showing the same.
Figure 7C:
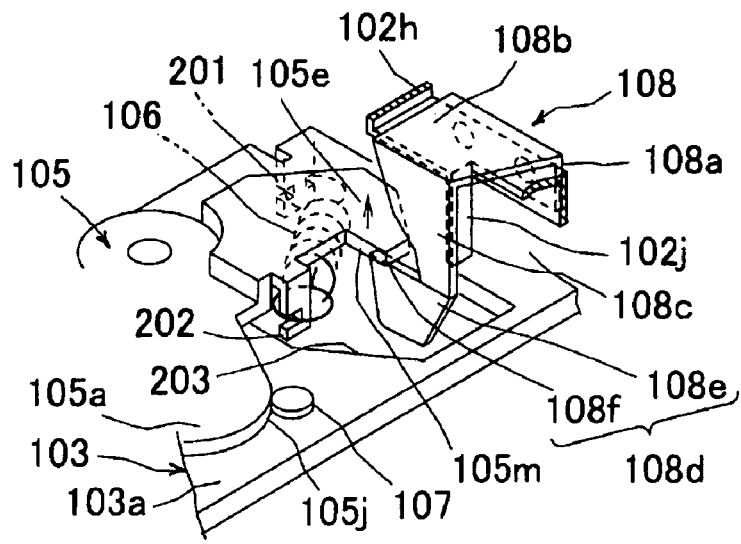
FIG. 7C is a perspective view showing the same.

Referring to FIGS. 6A through 6C, the eject lever operating portion 108d is moved in an escaping direction (the direction of an arrow A) when the cartridge holder 102 is moved from the cartridge insertion/removal position to the recording/reproducing position. At this time, the inclined surface portion 108e is pressed by the side surface 105m of the operated portion 105e of the eject lever 105 to be described in detail later. Reference is now made to FIGS. 7A through 7C. When the cartridge holder 102 moves to the cartridge recording/reproducing position, the pressure on the inclined surface portion 108e by the side surface 105m of the operated portion 105e is released, causing the elastic flap portion 108c to make a return motion, that is, to return elastically. The engagement portion 108f then engages the lower surface 105n of the operated portion 105e.

The operation of moving the cartridge holder 102 from the cartridge insertion/removal position to the recording/reproducing position after recording and/or reproducing has been completed is performed as follows. Specifically, referring to FIGS. 8A through 8C, the eject lever 105 is raised via the lower surface 105n of the operated portion 105e of the eject lever 105, leaving an upper surface of the chassis 103. Locking of the eject lever 105 by the eject lever lock means 107 is then released. The eject lever 105 is now rotated by the urging force of the urge means 106, pushing the disk cartridge 1 out of the cartridge holder 102.

The lock release means 108 is disposed in an idle space as a substantially triangular dead space formed by the arcuate front surface 3a of the cartridge main body 3 of the disk cartridge 1 inserted in the cartridge holder 102, and one side surface and a front surface of the cartridge holder 102. In addition, the cartridge holder 102 is rotatably mounted to the chassis 103. When the cartridge holder 102 is rotationally moved from the cartridge insertion/removal position to the recording/reproducing position, locking of the eject lever 105 by the eject lever lock means 107 is released.

(9) Other Arrangements

In the exemplary case described in the foregoing, the eject lever 105 is designed to be rotationally moved. An arrangement may nonetheless be possible, in which the eject lever 105 makes a linear motion.

Figure 23:
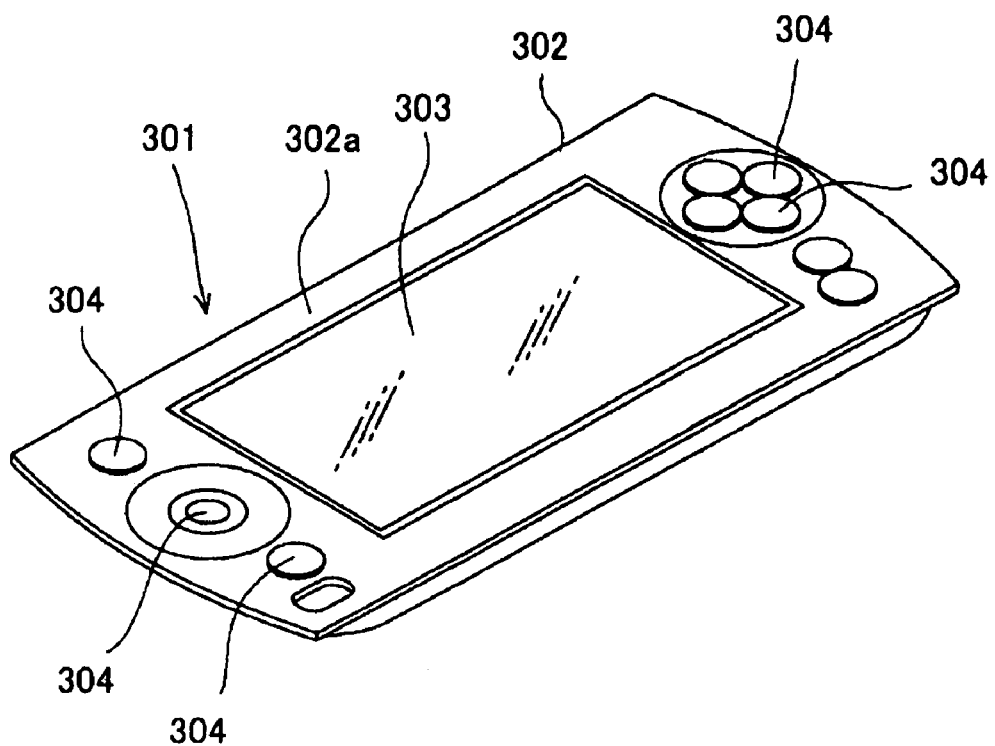
FIG. 23 is a perspective view showing an electronic apparatus.
Figure 24:
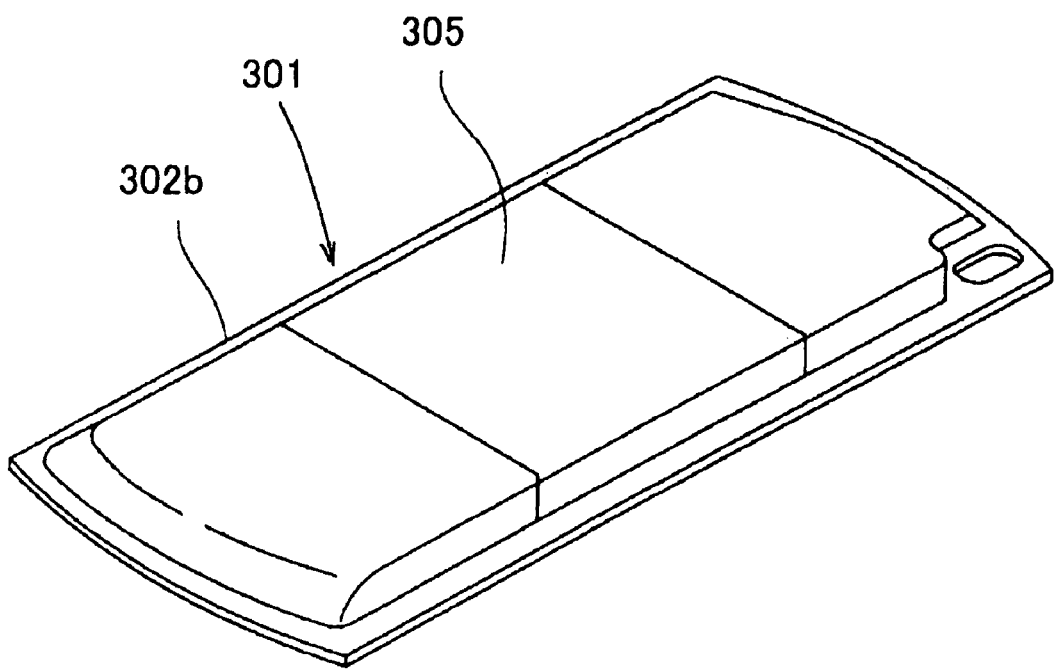
FIG. 24 is a perspective view showing the electronic apparatus as viewed from a backside thereof.
Figure 25:
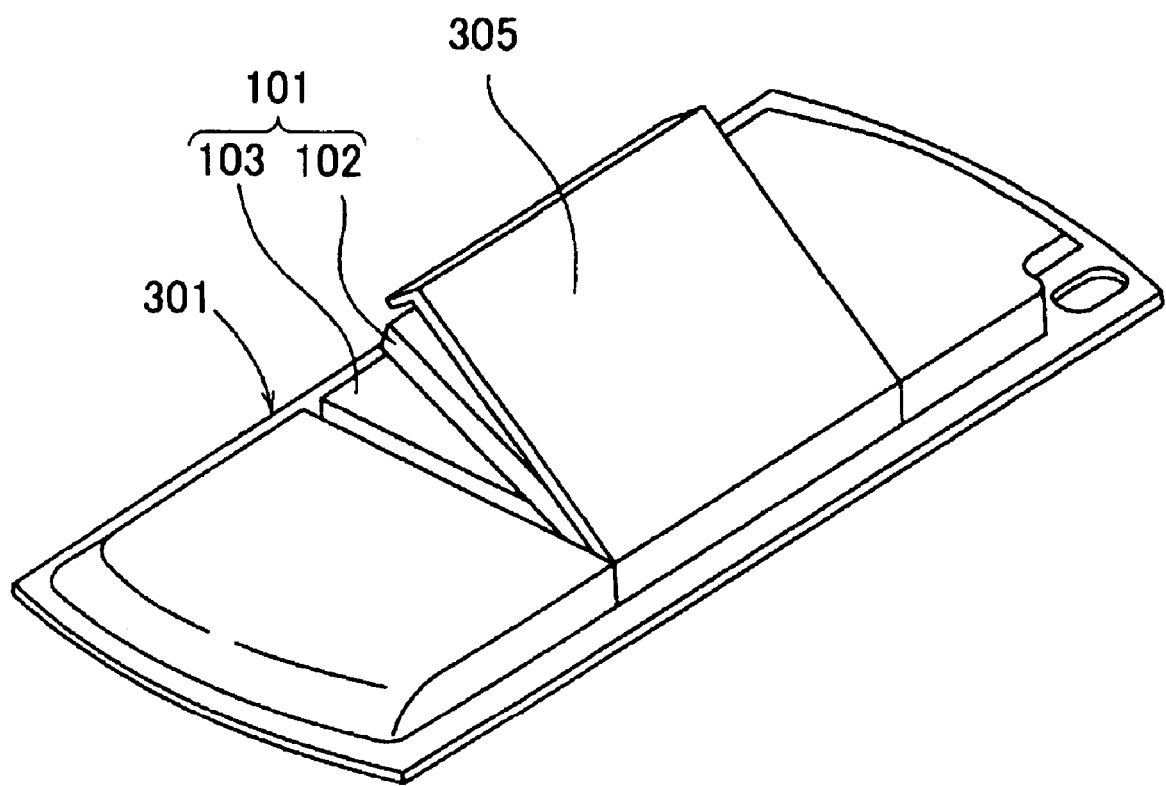
FIG. 25 is a perspective view showing a condition, in which a lid portion is open.

FIGS. 23 through 25 are views showing an electronic apparatus 301, such as a gaming machine or the like, mounted with the disk recording and/or reproducing apparatus 101 according to the present invention. The electronic apparatus 301 is formed into a flat, horizontally long rectangle. Referring to FIG. 23, a display portion 303, such as liquid crystal or the like, is disposed at a central portion on the side of a front surface 302a of an outer housing 302 of the electronic apparatus 301. A plurality of control keys 304 is disposed on both sides of the electronic apparatus 301. Referring to FIG. 24, a lid portion 305 that can be rotatably opened or closed is disposed at a central portion on the side of a back surface 302b of the outer housing 302 of the electronic apparatus 301. Referring to FIG. 25, the cartridge holder 102 of the disk recording and/or reproducing apparatus 101 is mounted on the lid portion 305. The chassis 103 of the disk recording and/or reproducing apparatus 101 is mounted on the side of the outer housing 302. It is designed that opening the lid portion 305 will rotate and bring the cartridge holder 102 to the cartridge insertion/removal position.

(10) Operation

Operation of the disk recording and/or reproducing apparatus 101 will be described below in each of the following two cases: in one, in which the disk cartridge 1 with the shutter is used and in the other, in which the shutter-less disk cartridge 1A is used.

Figure 26A:
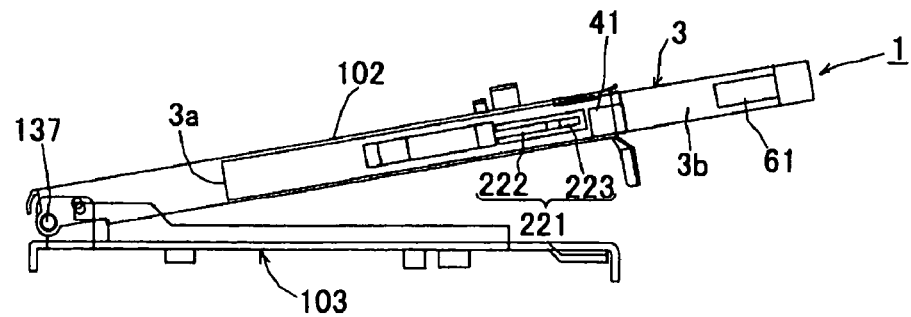
FIG. 26A is a side elevational view showing an operation when a disk cartridge including a shutter is used.
Figure 26B:
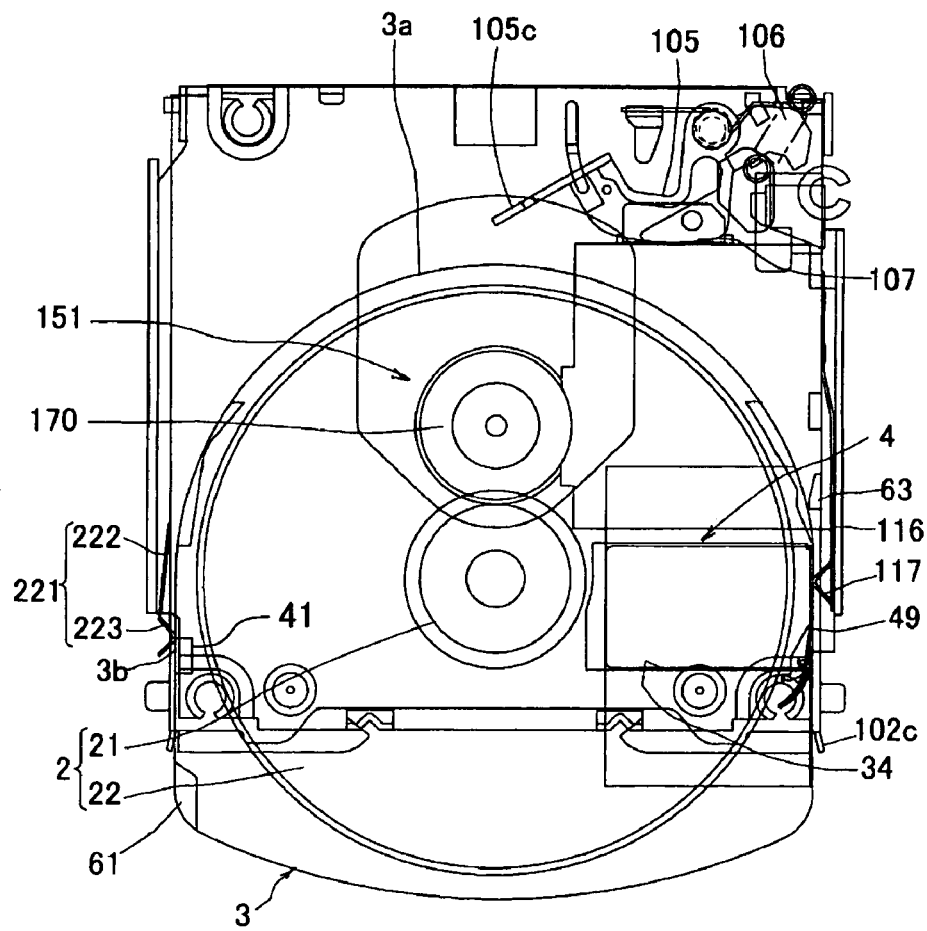
FIG. 26B is a plan view showing the same.

When the disk cartridge 1 having the shutter is used:

When the lid portion 305 of the electronic apparatus 301 is opened, the cartridge holder 102 follows the movement of the lid portion 305 to be rotated and moved to the cartridge insertion/removal position. The disk cartridge 1 is inserted into the cartridge holder 102 positioned at the cartridge insertion/removal position as shown in FIGS. 26A and 26B. At this time, the protruded portion 223 of the cartridge drop preventive means 221 makes a sliding contact with the first side surface 3b of the cartridge main body 3 of the disk cartridge 1. At the same time, the protruded portion 117 at the leading end of the shutter lock release member 116 makes a sliding contact with the outer surface of the first movement guide flap 49 of the shutter member 4. A substantially even side pressure is thus applied to the first side surface 3b and the second side surface 3c of the cartridge main body 3 of the disk cartridge 1.

Figure 27A:
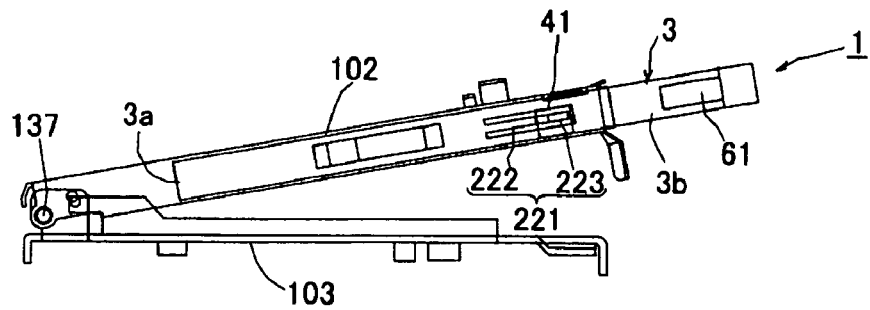
FIG. 27A is a side elevational view showing an operation when a disk cartridge including a shutter is used.
Figure 27B:
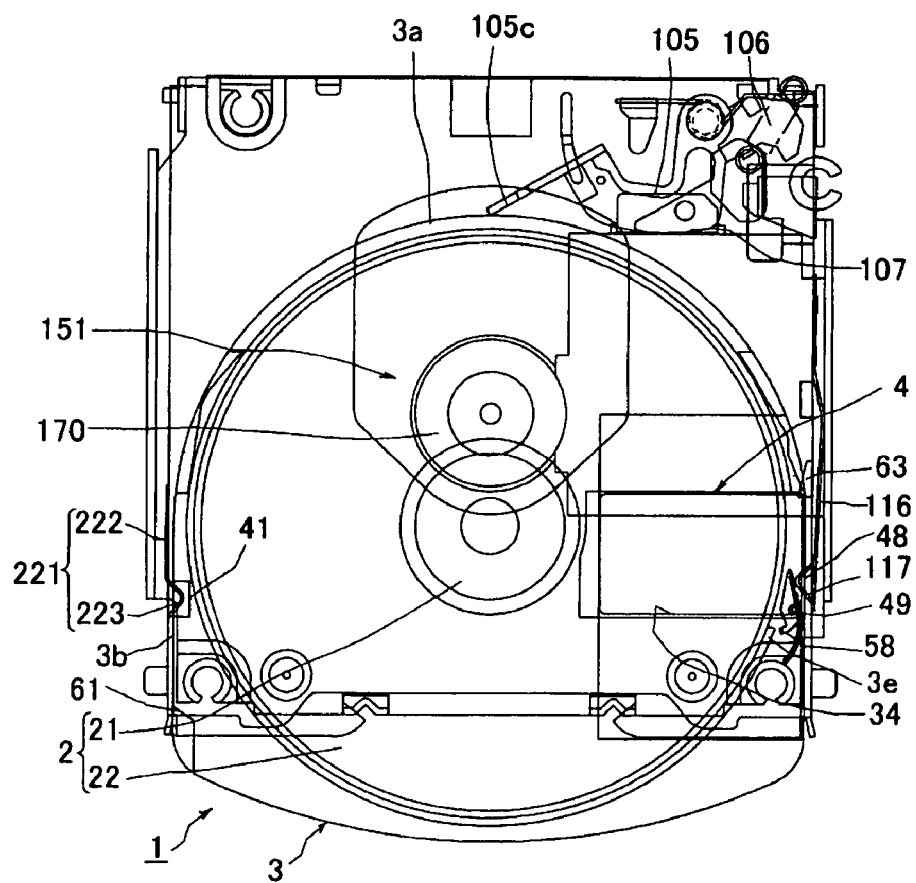
FIG. 27B is a plan view showing the same.

When the disk cartridge 1 is inserted into the cartridge holder 102 a predetermined amount, the protruded portion 117 of the shutter lock release member 116 fits into the opening portion 48 for pressing operation disposed in the first movement guide flap 49 as shown in FIGS. 27A and 27B. The protruded portion 117 of the shutter lock release member 116 thereby presses the pressed portion 57 of the shutter movement restriction member 5 of the disk cartridge 1, thus unlocking the shutter member 4. At the same time, a shutter movement inhibiting protruded portion 63 disposed on an inner surface of the second side surface plate 102c of the cartridge holder 102 abuts against one end portion of the shutter member 4, thus inhibiting the shutter member 4 from moving. At this time, in the first side surface 3b, the protruded portion 223 of the cartridge drop preventive means 221 disposed in the cartridge holder 102 fits in the function enhancement groove 41 included in the disk cartridge.

When the disk cartridge 1 is further inserted, the cartridge main body 3 only is inserted into the cartridge holder 102 with the shutter member 4 remaining stationary, thus opening the recording and/or reproducing opening portion 34 of the disk cartridge 1. In the meantime, the eject lever 105 is pressed and rotated allowing the urge means 106 to accumulate the urging force.

When the disk cartridge 1 is entirely accommodated in the cartridge holder 102, the eject lever 105 is locked to be incapable of rotating backward by the eject lever lock means 107. The protruded portion 223 of the cartridge drop preventive means 221 fits into the recessed portion 61 for releasing the first side pressure disposed in the first side surface 3b of the cartridge main body 3 of the disk cartridge 1, thereby releasing the side pressure.

The cartridge holder 102 is then moved from the cartridge insertion/removal position to the recording/reproducing position for performing recording and/or reproducing. The cartridge holder 102 is moved from the cartridge insertion/removal position to the recording/reproducing position as follows. Specifically, the side surface 105m of the operated portion 105e of the eject lever 105 contacts the inclined surface portion 108e of the lock release means 108, causing the elastic flap portion 108c to flex in what is called an escaping direction. When an end portion of the inclined surface portion 108e moves to the position of the operated portion 105e of the eject lever 105, the contact between the inclined surface portion 108e and the side surface 105m of the operated portion 105e of the eject lever 105 is released. The elastic flap portion 108c then returns elastically and the engagement portion 108f engages the lower surface 105n of the operated portion 105e of the eject lever 105.

Figure 28A:
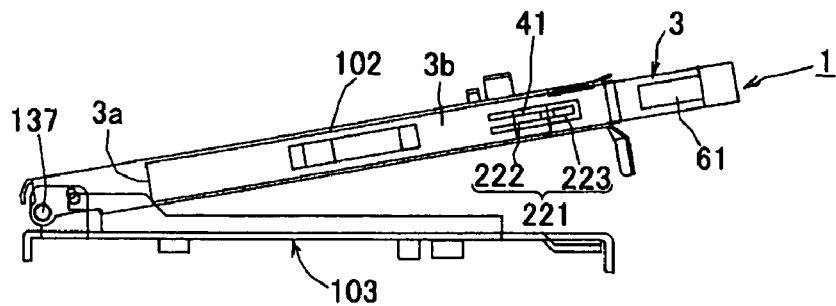
FIG. 28A is a side elevational view showing an operation when a disk cartridge including a shutter is used.
Figure 28B:
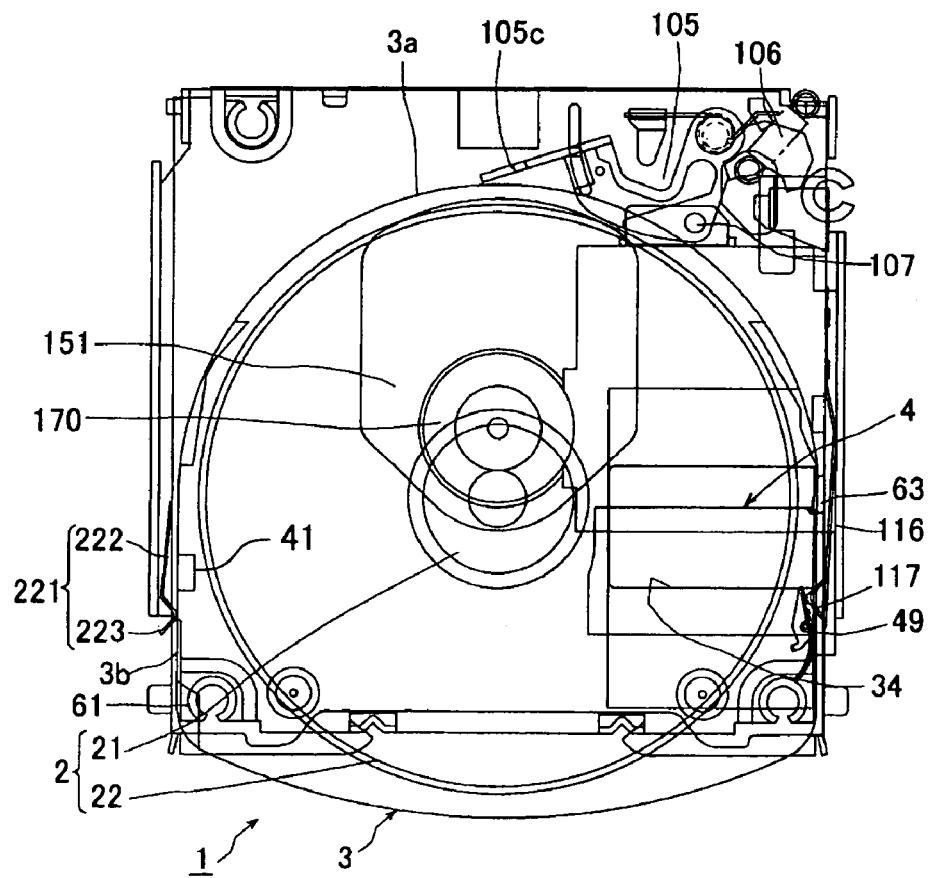
FIG. 28B is a plan view showing the same.

Moving the cartridge holder 102 to the cartridge insertion/removal position after recording and/or reproducing of the disk cartridge 1 has been completed results in the following sequence of operations. Specifically, referring to FIGS. 8A through 8C, the engagement portion 108f raises the lower surface 105n of the operated portion 105e of the eject lever 105, thus releasing locking of the eject lever 105 by the eject lever lock means 107. Contrary to the foregoing steps followed during insertion of the disk cartridge, the disk cartridge 1 is ejected out of the cartridge holder 102 through the steps depicted in FIGS. 29A and 29B, FIGS. 28A and 28B, FIGS. 27A and 27B, and FIGS. 26A and 26B. When a disk cartridge ejection sequence is started by the eject lever, a state as shown in FIGS. 29A and 29B, in which the protruded portion 223 of the cartridge drop preventive means 221 fits in the recessed portion 61 for releasing the first side pressure, is shifted to a state as shown in FIGS. 28A and 28B. Referring to FIGS. 28A and 28B, when the disk cartridge is ejected out by the eject lever, the protruded portion 223 makes a sliding contact with the first side surface 3b. This sliding contact prevents the disk cartridge from being unloaded. When unloading of the disk cartridge further continues, the protruded portion 223 fits in the function enhancement groove 41 disposed in the first side surface 3b as shown in FIGS. 27A and 27B. This fitting of the protruded portion 223 in the function enhancement groove 41 further prevents the disk cartridge from being unloaded. Referring now to FIGS. 26A and 26B, the protruded portion 223 of the cartridge drop preventive means 221 thereafter makes another sliding contact with the first side surface 3b of the cartridge main body 3 of the disk cartridge 1. At the same time, the protruded portion 117 at the leading end of the shutter lock release member 116 makes a sliding contact with the outer surface of the first movement guide flap 49 of the shutter member 4. A substantially even side pressure (frictional resistance) is thus applied to the first side surface 3b and the second side surface 3c of the cartridge main body 3 of the disk cartridge 1. The disk cartridge 1 is thereby prevented from jumping out of the cartridge holder 102.

Figure 30:
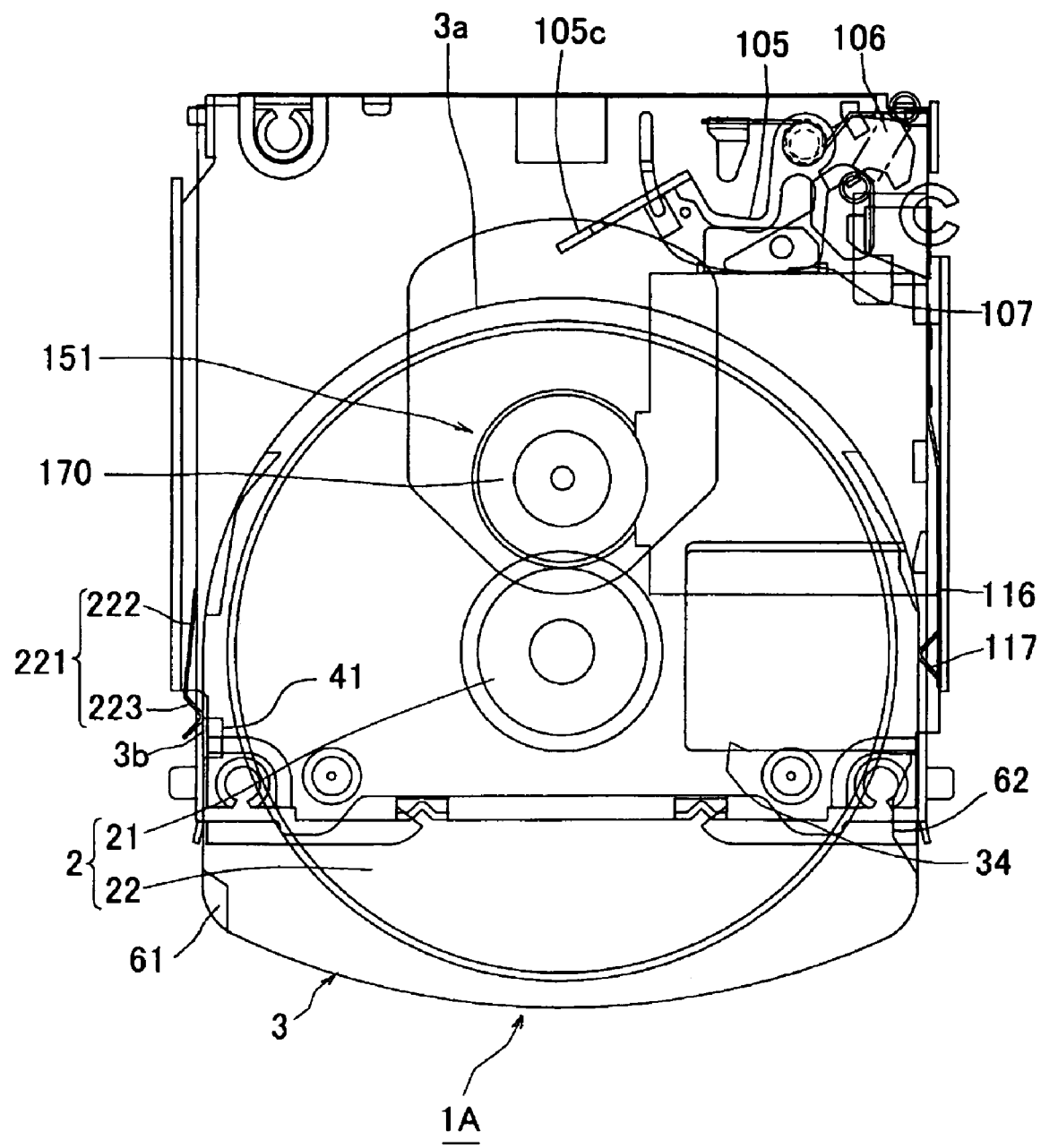
FIG. 30 is a plan view showing an operation when a disk cartridge having no shutter is used.
Figure 31:
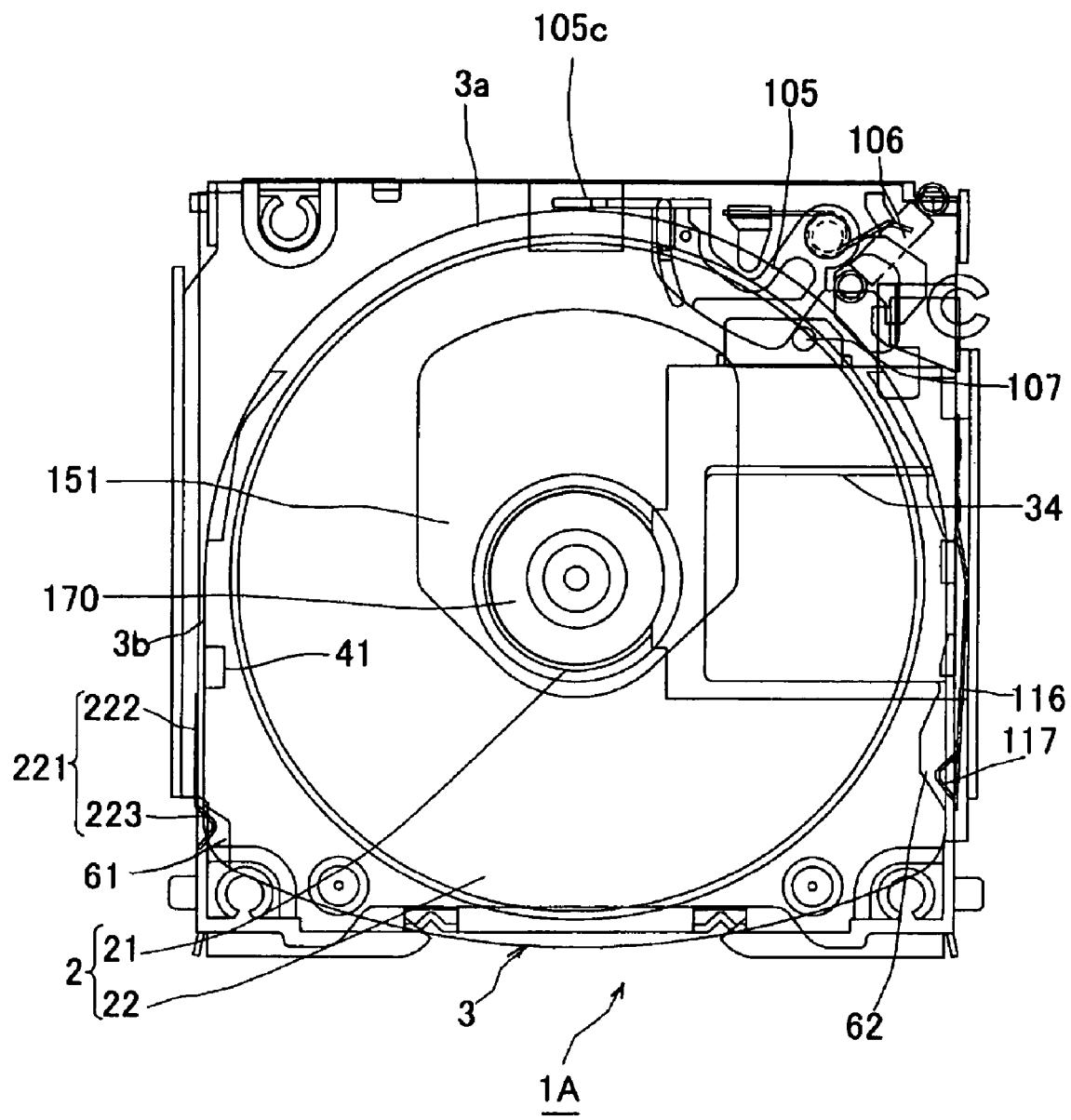
FIG. 31 is a plan view showing an operation when a disk cartridge having no shutter is used.

With the shutter-less disk cartridge 1A, when the disk cartridge 1 is inserted in the cartridge holder 102 at the cartridge insertion/removal position, the protruded portion 223 of the cartridge drop preventive means 221 makes a sliding contact with the first side surface 3b of the cartridge main body 3 of the disk cartridge 1A as shown in FIG. 30. At the same time, the protruded portion 117 at the leading end of the shutter lock release member 116 makes a sliding contact with the second side surface 3c of the cartridge main body 3. A substantially even side pressure is thus applied to the first side surface 3b and the second side surface 3c of the cartridge main body 3 of the disk cartridge 1.

When the disk cartridge 1 is entirely accommodated in the cartridge holder 102, the protruded portion 223 of the cartridge drop preventive means 221 fits into the recessed portion 61 for releasing the first side pressure disposed in the first side surface 3b of the cartridge main body 3 of the disk cartridge 1, thereby releasing the side pressure. At the same time, the protruded portion 117 at the leading end of the shutter lock release member 116 fits into the recessed portion 62 for releasing the second side pressure disposed in the second side surface 3c of the cartridge main body 3, thus releasing the side pressure. Other operations are identical to the case of the disk cartridge 1 with the shutter and the same description is not repeated.

INDUSTRIAL APPLICABILITY

A sliding resistance, that is, a side pressure is applied during ejection to the first side surface of the disk cartridge using the cartridge drop preventive means, thereby preventing the disk cartridge from jumping out of the cartridge holder. In particular, the cartridge drop preventive means is formed to include the elastic flap portion and the protruded portion disposed at the leading end portion of the elastic flap portion. The protruded portion can therefore be pressed up against the first side surface of the disk cartridge with an adequate side pressure by the elastic flap portion.

When storage of the disk cartridge in the cartridge holder is completed, the protruded portion at of the shutter lock release member is kept in a noncontact condition with respect to the first side surface of the disk cartridge. The disk cartridge is thereby released from the side pressure of the cartridge drop preventive means.

It is also possible to balance between the side pressures applied to both sides of the cartridge holder using the side pressure of the cartridge drop preventive means disposed on the first side surface plate of the cartridge holder and the side pressure of the shutter lock release member disposed on the second side surface of the cartridge holder.

The cartridge drop preventive means is formed by cutting and raising the first side surface plate of the cartridge holder. This helps suppress an increase in the number of parts used.

The invention claimed is:
1. A disk recording and/or reproducing apparatus, comprising:
   recording and/or reproducing mechanism disposed in a chassis, the recording and/or reproducing mechanism configured to record on and/or reproduce data from a disk cartridge;
   a cartridge holder supported on the chassis movably between an insertion/removal position, at which the disk cartridge is inserted or removed, and a recording/repro- ducing position, at which the disk cartridge is recorded or reproduced by the recording and/or reproducing mechanism;

an eject lever disposed on the chassis so as to be movable in a disk cartridge insertion/removal direction, the eject lever being pressed by an insertion end of the disk cartridge inserted in the cartridge holder to be moved in the disk cartridge insertion direction;

an urge mechanism configured to urge the eject lever in the disk cartridge removal direction; and a cartridge drop preventive mechanism disposed on a side surface plate of a second side wall of the cartridge holder, the cartridge drop preventive mechanism making a sliding contact with a side surface of the disk cartridge stored in the cartridge holder, including an elastic flap portion provided on the second side wall of the cartridge holder opposite a first side wall facing a reproducing/recording opening portion, and a rear-anchor portion of said elastic flap portion being connected to the second side wall, and a leading end of the elastic flap portion oriented toward the insertion/removal position, giving the disk cartridge stored in the cartridge holder a braking force, and a protruded portion disposed on a leading end portion of the elastic flap portion, the protruded portion making sliding contact with a side surface of the disk cartridge, wherein the disk cartridge has a side surface of an insertion end thereof formed into an arc.

2. A disk recording and/or reproducing apparatus, comprising:

recording and/or reproducing means disposed in a chassis, the recording and/or reproducing means recording and/or reproducing a disk cartridge;

a cartridge holder supported on the chassis movably between an insertion/removal position, at which the disk cartridge is inserted or removed, and a recording/reproducing position, at which the disk cartridge is recorded or reproduced by the recording and/or reproducing means;

an eject lever disposed on the chassis so as to be movable in a disk cartridge insertion/removal direction, the eject lever being pressed by an insertion end of the disk cartridge inserted in the cartridge holder to be moved in the disk cartridge insertion direction;

urge means urging the eject lever in the disk cartridge removal direction; and cartridge drop preventive means disposed on a side surface plate of a second side wall of the cartridge holder, the cartridge drop preventive means making a sliding contact with a side surface of the disk cartridge stored in the cartridge holder, including an elastic flap portion provided on the second side wall of the cartridge holder opposite a first side wall facing a reproducing/recording opening portion, and a rear-anchor portion of said elastic flap portion being connected to the second side wall, and a leading end of the elastic flap portion oriented toward the insertion/removal position, giving the disk cartridge stored in the cartridge holder a braking force, and a protruded portion disposed on a leading end portion of the elastic flap portion, the protruded portion making sliding contact with a side surface of the disk cartridge, wherein the disk cartridge has a side surface of an insertion end thereof formed into an arc.

3. The recording and/or reproducing apparatus according to claim 2, wherein the disk cartridge includes a recessed portion disposed in part of the side surface thereof; and when storage of the disk cartridge in the cartridge holder is completed, the protruded portion of the cartridge drop preventive means fits into the recessed portion.

4. The apparatus of claim 2, wherein the cartridge holder is supported rotatably on the chassis so as to be rotatable in an open position for receiving the disk cartridge, and rotatable to a closed position.

5. The apparatus of claim 2, wherein the elastic flap portion is configured to move with respect to the second side wall of the cartridge holder while the disk cartridge moves from the recording/reproducing position to the insertion/removal position, the leading end of the elastic flap portion being configured to fit in a recessed portion of the disk cartridge at the recording/reproducing position, and fit into a groove at the insertion/removal position.

6. The apparatus of claim 2, wherein the apparatus is configured to be mounted to a side of an outer housing.

7. The disk recording and/or reproducing apparatus according to claim 2, wherein the cartridge drop preventive means is formed by cutting and raising the side surface plate of the cartridge holder.

8. The disk recording and/or reproducing apparatus of claim 2 wherein the eject lever is configured to push against a front of the disk cartridge when disposed in the apparatus.

9. A disk recording and/or reproducing apparatus, comprising:

recording and/or reproducing means disposed in a chassis, the recording and/or reproducing means recording and/or reproducing a disk cartridge;

a cartridge holder supported on the chassis movably between an insertion/removal position, at which the disk cartridge is inserted or removed, and a recording/reproducing position, at which the disk cartridge is recorded or reproduced by the recording and/or reproducing means;

an eject lever disposed on the chassis so as to be movable in a disk cartridge insertion/removal direction, the eject lever being pressed by an insertion end of the disk cartridge inserted in the cartridge holder to be moved in the disk cartridge insertion direction;

urge means urging the eject lever in the disk cartridge removal direction; and cartridge drop preventive means disposed on a side surface plate of a second side wall of the cartridge holder, the cartridge drop preventive means making a sliding contact with a side surface of the disk cartridge stored in the cartridge holder, including an elastic flap portion provided on the second side wall of the cartridge holder opposite a first side wall facing a reproducing/recording opening portion, and a rear-anchor portion of said elastic flap portion being connected to the second side wall, and a leading end of the elastic flap portion oriented toward the insertion/removal position, giving the disk cartridge stored in the cartridge holder a braking force, and a protruded portion disposed on a leading end portion of the elastic flap portion, the protruded portion making sliding contact with a side surface of the disk cartridge, wherein the disk cartridge has a side surface of an insertion end thereof formed into an arc, wherein the disk cartridge further includes a groove portion disposed in part of the side surface thereof; and when the disk cartridge is unloaded from the cartridge holder, the protruded portion first makes a sliding contact with the side surface of the disk cartridge and then fits into the groove portion.

10. The recording and/or reproducing apparatus according to claim 9, wherein the disk cartridge further includes the opening portion that allows a disk stored to face an outside and a shutter member that is locked in a position of closing the opening portion and disposed so as to be movable between a position of opening the opening portion and the position of closing the opening portion; and a side surface plate including a shutter lock release member for releasing locking of the shutter member.

11. A disk recording and/or reproducing apparatus, comprising:

recording and/or reproducing means disposed in a chassis, the recording and/or reproducing means recording and/or reproducing a disk cartridge;

a cartridge holder supported on the chassis movably between an insertion/removal position, at which the disk cartridge is inserted or removed, and a recording/reproducing position, at which the disk cartridge is recorded or reproduced by the recording and/or reproducing means:

an eject lever disposed on the chassis so as to be movable in a disk cartridge insertion/removal direction, the eject lever being pressed by an insertion end of the disk cartridge inserted in the cartridge holder to be moved in the disk cartridge insertion direction;

urge means urging the eject lever in the disk cartridge removal direction; and cartridge drop preventive means disposed on a side surface plate of a second side wall of the cartridge holder, the cartridge drop preventive means making a sliding contact with a side surface of the disk cartridge stored in the cartridge holder, including an elastic flap portion provided on the second side wall of the cartridge holder opposite a first side wall facing a reproducing/recording opening portion, and a rear-anchor portion of said elastic flap portion being connected to the second side wall, and a leading end of the elastic flap portion oriented toward the insertion/removal position, giving the disk cartridge stored in the cartridge holder a braking force, and a protruded portion disposed on a leading end portion of the elastic flap portion, the protruded portion making sliding contact with a side surface of the disk cartridge, wherein the disk cartridge has a side surface of an insertion end thereof formed into an arc, wherein the apparatus is configured to be mounted to a side of an outer housing, further comprising the outer housing, and the outer housing includes a plurality of control keys disposed on a side of the housing opposite the side of the outer housing on which the recording/reproducing apparatus is mounted.

* * * * *